United States Patent
Xu et al.

(10) Patent No.: US 12,285,015 B2
(45) Date of Patent: Apr. 29, 2025

(54) AGROCHEMICAL FORMULATIONS

(71) Applicant: BASF AGRO B.V., Arnhem (NL)

(72) Inventors: Wen Xu, Research Triangle Park, NC (US); Kara Walden Benton, Research Triangle Park, NC (US)

(73) Assignee: BASF AGRO B.V., Arnhem (NL)

( * ) Notice: Subject to any disclaimer, the term of this patent is extended or adjusted under 35 U.S.C. 154(b) by 288 days.

(21) Appl. No.: 16/961,392

(22) PCT Filed: Jan. 18, 2019

(86) PCT No.: PCT/EP2019/051199
§ 371 (c)(1),
(2) Date: Jul. 10, 2020

(87) PCT Pub. No.: WO2019/145221
PCT Pub. Date: Aug. 1, 2019

(65) Prior Publication Data
US 2020/0383333 A1    Dec. 10, 2020

(30) Foreign Application Priority Data
Jan. 29, 2018    (EP) .................................... 18153788

(51) Int. Cl.
*A01N 43/90*    (2006.01)
*A01N 25/04*    (2006.01)
*A01N 25/30*    (2006.01)
*A01N 53/00*    (2006.01)

(52) U.S. Cl.
CPC ............. *A01N 43/90* (2013.01); *A01N 25/04* (2013.01); *A01N 25/30* (2013.01); *A01N 53/00* (2013.01)

(58) Field of Classification Search
CPC .................................................... A01N 53/00
See application file for complete search history.

(56) References Cited

U.S. PATENT DOCUMENTS

| | | | |
|---|---|---|---|
| 4,997,970 A | 3/1991 | Ager, Jr. | |
| 5,028,731 A | 7/1991 | Glenn | |
| 5,164,411 A | 11/1992 | Baum et al. | |
| 2009/0118367 A1* | 5/2009 | Steward | A01N 53/00 514/531 |
| 2013/0125267 A1* | 5/2013 | Pohlman | A01N 43/90 800/298 |
| 2015/0031535 A1* | 1/2015 | Xu | A01N 53/00 504/100 |

FOREIGN PATENT DOCUMENTS

| | | | |
|---|---|---|---|
| EP | 2223599 A1 | 9/2010 | |
| WO | WO-2011/147952 A1 | 12/2011 | |
| WO | WO-2016/038067 A1 | 3/2016 | |
| WO | WO-2016116797 A1 * | 7/2016 | ............ A01N 37/10 |
| WO | WO-2017/025581 A1 | 2/2017 | |
| WO | WO-2017/025582 A1 | 2/2017 | |
| WO | WO-2018/019828 A1 | 2/2018 | |
| WO | WO-2018/149674 A1 | 8/2018 | |
| WO | WO-2019/072602 A1 | 4/2019 | |
| WO | WO-2019/145221 A1 | 8/2019 | |

OTHER PUBLICATIONS

European Search Report for EP Patent Application No. 18153788.7, Issued on Mar. 15, 2018, 3 pages.
International Application No. PCT/EP2019/051199, International Search Report and Written Opinion, mailed Feb. 18, 2019.

* cited by examiner

*Primary Examiner* — Nicole P Babson
*Assistant Examiner* — John P Nguyen

(57) ABSTRACT

Agrochemical formulation, comprising afidopyropen, a cypermethrin like alpha-cypermethrin, a) at least one organic solvent S, b) at least one alkanol substituted amine D, c) at least one aryl sulfonic acid E or their salts, d) at least one organic tricarboxylic acid F or their salts, e) at least one nonionic surfactant G different from components c) to f) and h), f) optionally further components.

21 Claims, No Drawings

AGROCHEMICAL FORMULATIONS

The present invention is related to Agrochemical formulation, comprising
a) afidopyropen,
b) a cypermethrin like alpha-cypermethrin,
c) at least one organic solvent S,
d) at least one alkanol substituted amine D,
e) at least one aryl sulfonic acid E or their salts,
f) at least one organic tricarboxylic acid F or their salts,
g) at least one nonionic surfactant G different from components c) to f) and h),
h) optionally further components.

Afidopyropen has the chemical structure as shown in formula I

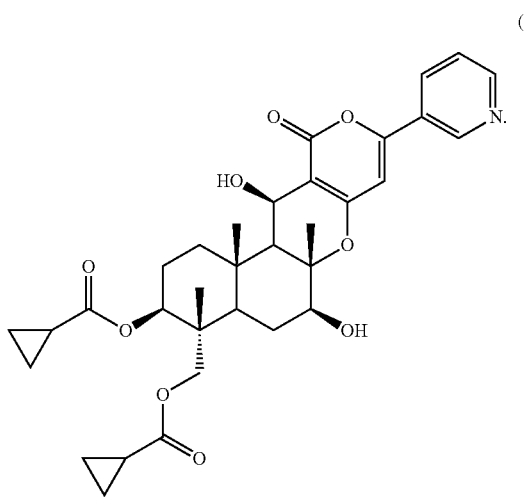

Afidopyropen is known to exhibit pesticidal activity against invertebrate pests, in particular against insects and is thus very useful for crop protection.

EP 2223599 suggests various agrochemical formulations of the afidopyropen, including an aqueous suspension concentrate formulation, and suitable additives for such formulations. However, when trying to formulate afidopyropen, especially as an emulsifiable concentrate, one faces several difficulties, as the formulation has only poor stability upon storage. As it turned out, afidopyropen may partly decompose.

Cypermethrines are other known pesticides. Cypermethrines may also be subject to degradation or decomposition upon storage.

To be able to store and apply afidopyropen and cypermethrines together in one formulation, there was a need for a formulation in which both these classes of compounds are stable.

This objective has been reached by formulations comprising
a) afidopyropen,
b) a cypermethrin like alpha-cypermethrin,
c) at least one organic solvent S,
d) at least one alkanol substituted amine D,
e) at least one alkyl aryl sulfonic acid E or their salts,
f) at least one organic tricarboxylic acid F or their salts,
g) at least one nonionic surfactant G different from components c) to f) and h),
h) optionally further components.

Preferably, formulations according to the invention comprise
a) afidopyropen,
b) a cypermethrin like alpha-cypermethrin,
c) at least one organic solvent S,
d) at least one alkanol substituted tertiary amine D,
e) at least one alkyl aryl sulfonic acid E or their salts,
f) at least one organic tricarboxylic acid F or their salts,
g) at least one nonionic surfactant G different from components c) to f) and h),
h) optionally further components.

Afidopyropen is comprised in formulations according to the invention in amounts from 0.1 to 15 wt %, preferably 1 to 10 wt %, more preferably 1 to 5 wt %, in each case based on the formulation.

The term "cypermethrin" means the synthetic pyrethroid (R,S)-α-cyano-3-phenoxybenzyl-(1RS)-cis-trans-3-(2,2-dichlorovinyl)-2,2-dimethylcyclopropanecarboxylate which consists of a mixture of eight isomers, each of which are present in approximately the same amounts. Since the discovery and commercialization of cypermethrin, products containing increased amounts of certain isomers have been developed. As used herein, the term "enriched cypermethrin" refers to the following:

alpha-cypermethrin which is a racemate comprising (S)-α-cyano-3-phenoxybenzyl (1R)-cis-3-(2,2-dichlorovinyl)-2,2-dimethylcyclopropanecarboxylate and (R)-α-cyano-3-phenoxybenzyl (1S)-cis-3-(2,2-dichlorovinyl)-2,2-dimethylcyclopropanecarboxylate;

beta-cypermethrin which is a reaction mixture comprising two enantiomeric pairs in a ratio of about 2:3 (S)-α-cyano-3-phenoxybenzyl (1R)-cis-3-(2,2-dichlorovinyl)-2,2-dimethylcyclopropanecarboxylate and (R)-α-cyano-3-phenoxybenzyl (1S)-cis-3-(2,2-dichlorovinyl)-2,2-dimethylcyclopropanecarboxylate with (S)-α-cyano-3-phenoxybenzyl (1R)-trans-3-(2,2-dichlorovinyl)-2,2-dimethylcyclopropanecarboxylate and (R)-α-cyano-3-phenoxybenzyl (1S)-trans-3-(2,2-dichlorovinyl)-2,2-dimethylcyclopropanecarboxylate;

theta-cypermethrin which is a 1:1 mixture of the enantiomers (R)-α-cyano-3-phenoxybenzyl (1S)-trans-3-(2,2-dichlorovinyl)-2,2-dimethylcyclopropanecarboxylate and (S)-α-cyano-3-phenoxybenzyl (1R)-trans-3-(2,2-dichlorovinyl)-2,2-dimethylcyclopropanecarboxylate; and zeta-cypermethrin which is (R,S)-α-cyano-3-phenoxybenzyl-(1RS)-cis-trans-3-(2,2-dichlorovinyl)-2,2-dimethylcyclopropanecarboxylate which has been enriched in the 1R-cis-S and 1R-trans-isomers].

A particular form of "zeta-cypermethrin" is (R,S)-α-cyano-3-phenoxybenzyl-(1RS)-cis-trans-3-(2,2-dichlorovinyl)-2,2-dimethylcyclopropanecarboxylate which has been enriched in the 1R-cis-S and 1R-trans-S isomers by the processes disclosed in patents U.S. Pat. Nos. 5,164,411, 5,028,731 and 4,997,970. A most preferred form of "zeta-cypermethrin" is the cypermethrin isomer mixture prepared by the process disclosed in U.S. Pat. No. 4,997,970 starting with a 55/45 cis/trans mixture of cypermethrin with a catalytic amount of tricaprylylammonium chloride (Aliquat® 336, Aldrich Chemical Co.) and sodium carbonate in n-heptane. This process and the subsequent isolation procedure produces zeta-cypermethrin containing a small amount, usually 0.6% to 1.3%, of the catalyst. The presence of this catalyst adds to the complexity of producing a formulation that is stable when diluted with water.

Preferably the cypermethrin used in formulations according to the invention is alpha-cypermethrin.

Cypermethrin, preferably alpha-cypermethrin, is comprised in formulations according to the invention in amounts from 0.1 to 15 wt %, preferably 1 to 10 wt %, in each case based on the formulation.

Organic solvents S can in principle be all organic solvents that are capable of dissolving all other components of the formulation at room temperature.

Solvents normally have a boiling point at atmospheric pressure (1013 mbar) of less than 200° C. or are vegetable or animal oils or derivatives thereof.

In the context of the miscibility of solvents, "water miscible" or "water soluble" shall mean that a solvent that is "miscible" with water has a solubility in water of at least 1% by weight at 20° C.

Organic solvents S, that have a water solubility of less than 1% by weight at 20° C., include:
- mineral oil fractions of medium to high boiling point, e.g. kerosene, diesel oil; oils of vegetable or animal origin; aliphatic, cyclic and aromatic hydrocarbons, e. g. toluene, paraffin, tetrahydronaphthalene, alkylated naphthalenes and C8 to C11 aromatic petroleum derivatives (aromatic hydrocarbons) with a boiling point range from 130° C. to 200° C.;
- vegetable oils such as coco oil, palm kern oil, palm oil, soya oil, rapeseed oil, corn oil and the methyl or ethyl esters of the afore-mentioned oils, hydrocarbons such as aromatic depleted, linear paraffinic, isoparaffinic, cycloparaffinic having a flash point between 40° C. and 250° C. and a distillation range between 150° C. and 450° C.;
- ketones, e.g. acetophenone;
- carbonates, e.g. dibutyl carbonate;
- esters, e.g. benzyl acetate, methyl benzoate, ethyl benzoate, propyl benzoate, butyl benzoate, benzyl lactate, 2-phenoxyethyl propionate;
- lactates, e.g. 2-ethylhexyl lactate;
- fatty acid esters,
- fatty acids;
- phosphonates;
- fatty acid amines;
- pyrrolidones, such as N-octylpyrrolidone, N-ethyl pyrrolidone, N-docedyl pyrrolidone;
- fatty acid amides, e.g. N,N-dimethyloctanamide, N,N-dimethylnonaneamide, N,N-dimethyldecanamide, N,N-Dimethyl 9-decenamide, lauryl N,N-dimethylamide, lauryl N,N-dimethylamide, and mixtures thereof.

Herein, "C8 dimethylamide" and "N,N-dimethyl octaneamide" shall be understood to mean "C8 fatty acid N,N-dimethylamide" (analogously for other chain lengths).

"Fatty acid" herein shall denote a linear or branched carboxylic acid with a saturated or unsaturated aliphatic chain.

Preferred organic solvents S that are not water miscible are:
- mineral oil fractions of medium to high boiling point, e.g. kerosene, diesel oil; oils of vegetable or animal origin; aliphatic, cyclic and aromatic hydrocarbons, e. g. toluene, paraffin, tetrahydronaphthalene, alkylated naphthalenes and C8 to C11 aromatic petroleum derivatives (aromatic hydrocarbons) with a boiling point range from 130° C. to 200° C.;
- vegetable oils such as coco oil, palm kern oil, palm oil, soya oil, rapeseed oil, corn oil and the methyl or ethyl esters of the afore-mentioned oils, hydrocarbons such as aromatic depleted, linear paraffinic, isoparaffinic, cycloparaffinic having a flash point between 40° C. and 250° C. and a distillation range between 150° C. and 450° C.;
- acetophenone; dibutyl carbonate; benzyl acetate, methyl benzoate, ethyl benzoate, propyl benzoate, butyl benzoate, benzyl lactate, 2-phenoxyethyl propionate; 2-Ethylhexyl lactate; fatty acid esters; fatty acids; C8-C12 fatty acid dimethyl amides; and mixtures thereof.

More preferred organic solvents S that are not water miscible are:
- acetophenone; dibutyl carbonate; benzyl acetate, methyl benzoate, ethyl benzoate, propyl benzoate, butyl benzoate, benzyl lactate, 2-phenoxyethyl propionate; 2-Ethylhexyl lactate; fatty acid esters; fatty acids; C8-C12 fatty acid dimethyl amides; and mixtures thereof.

C8-C12 fatty acid dimethyl amides include and preferred C8-C12 fatty acid dimethyl amides are:
- C8 dimethyl amide (N,N-dimethyloctanamide), C8/C10 dimethyl amide (mixture of N,N-dimethyloctanamide and N,N-dimethyldecanamide), C9 dimethyl amide (N,N-dimethylnonaneamide or N,N-Dimethyl isononaneamide), C10 dimethyl amide (N-Dimethyldecanamide or N,N-Dimethyl 9-decenamide), C12 dimethyl amide (lauryl N,N-dimethylamide).

Especially preferred organic solvents S are benzylacetate, methylbenzoate, C8-C12 fatty acid dimethyl amide, aromatic hydrocarbon or their mixtures.

Particularly preferred organic solvents S are benzylacetate, C8-C12 fatty acid dimethyl amide, aromatic hydrocarbon or their mixtures.

In one embodiment, organic solvent S comprises a mixture comprising C8-C12 fatty acid dimethylamide, aromatic hydrocarbons and benzylacetate.

In one embodiment, organic solvent S comprises a mixture comprising C8-C12 fatty acid dimethylamide, aromatic hydrocarbons and methylbenzoate.

In one embodiment, organic solvent S comprises a mixture comprising C10 dimethylamide, aromatic hydrocarbons and benzylacetate.

In one embodiment, organic solvent S comprises a mixture comprising C12 dimethylamide, aromatic hydrocarbons and benzylacetate.

In one embodiment, organic solvent S comprises a mixture comprising C10 dimethylamide, aromatic hydrocarbons and benzylacetate.

In one embodiment, organic solvent S comprises a mixture comprising C8/C10 dimethylamide, aromatic hydrocarbons and benzylacetate.

In one embodiment, organic solvent S comprises a mixture comprising C12 dimethylamide, aromatic hydrocarbons and methylbenzoate.

In one embodiment, organic solvent S comprises a mixture comprising C10 dimethylamide, aromatic hydrocarbons and methylbenzoate.

In one embodiment, organic solvent S comprises a mixture comprising C8/C10 dimethylamide, aromatic hydrocarbons and methylbenzoate.

Preferably, formulations according to the invention comprise at least one solvent that is not miscible with water.

Organic solvents S, that are miscible with water, include:
- alcohols, for example ethanol, n-/i-propanol, n-/i-/sec-/tert-butanol, benzyl alcohol, cyclohexanol, benzyl alcohol, diacetone alcohol, for example 4-hydroxy-4-methyl-2-pentanone, n-octanol, 2-ethylhexanol; glycol and derivatives such as polyethylene glycol, glycerol, propylene glycol, propylene glycol monomethyl ether acetate, dipropylene glycol monomethyl ether, propylene glycol monophenyl ether;

lactate esters such as n-propyl lactate, methyl lactate, ethyl lactate, isopropyl lactate, butyl lactate;

Carboxylic acid amides, e.g. N,N-dimethyl-propanamide, N,N-dimethyl-lactamide, N,N-dimethyl-butylamide; N,N-dimethyl-pentylamide; methyl-5-(d imethylamino)-2-methyl-5-oxopentanoate;

ketones, e.g. gamma-butyrolactone, gamma-valerolactone, epsilon-caprolactone;

lactate esters such as n-propyl lactate, methyl lactate, ethyl lactate, isopropyl lactate, butyl lactate;

lactones, e.g. N-methyl-pyrrolidone, N-propyl-pyrrolidone, N-butyl-pyrrolidone, N-octyl-pyrrolidone, 1,3-dimethyl-2-imidazolidinone, 1,3-diethyl-2-imidazolidinone, 1,3-diisopropyl imidazolidinone such as 2-imidazolidinone;

carbonates, e.g. glycerin carbonate, pentylene carbonate, butylene carbonate, propylene carbonate;

N-ethylmorpholine, dimethyl sulfoxide, and mixtures thereof.

Preferred organic solvents S, that are miscible with water, are:

ethanol, n-/i-propanol, n-/i-/sec-/tert-butanol, benzyl alcohol, cyclohexanol, benzyl alcohol, diacetone alcohol, for example 4-hydroxy-4-methyl-2-pentanone, n-octanol, 2-ethylhexanol; glycol and derivatives such as polyethylene glycol, glycerol, propylene glycol, propylene glycol monomethyl ether acetate, dipropylene glycol monomethyl ether, propylene glycol monophenyl ether;

n-propyl lactate, methyl lactate, ethyl lactate, isopropyl lactate, butyl lactate; N,N-dimethyl-propanamide, N,N-dimethyl-lactamide, N,N-dimethyl-butylamide; N,N-dimethyl-pentylamide;

methyl-5-(dimethylamino)-2-methyl-5-oxopentanoate;

gamma-butyrolactone, gamma-valerolactone, epsilon-caprolactone;

n-propyl lactate, methyl lactate, ethyl lactate, isopropyl lactate, butyl lactate;

N-methyl-pyrrolidone, N-propyl-pyrrolidone, N-butyl-pyrrolidone, N-octyl-pyrrolidone, 1,3-dimethyl-2-imidazolidinone, 1,3-diethyl-2-imidazolidinone, 1,3-diisopropyl imidazolidinone such as 2-imidazolidinone;

glycerin carbonate, butylene carbonate, propylene carbonate;

N-Ethylmorpholine, dimethyl sulfoxide, and mixtures thereof.

Especially preferred water miscible organic solvents S are N,N-dimethyllactamide, methyl-5-(dimethylamino)-2-methyl-5-oxopentanoate, acetophenone, DMSO, cyclohexanone, gamma-butyrolactone, propylene carbonate, propylene glycol, benzyl alcohol or their mixtures.

Particularly preferred water miscible organic solvent S are propylene carbonate and propylene glycol.

Formulations according to the invention typically comprise 0 to 30% by weight of organic solvents S, based on the formulation.

In one embodiment, formulations according to the invention comprise at least one solvent S selected from benzylacetate, methylbenzoate, C8-C12 fatty acid dimethyl amide, aromatic hydrocarbons or their mixtures and at least one organic solvent S selected from N,N-dimethyllactamide, methyl-5-(dimethylamino)-2-methyl-5-oxopentanoate, acetophenone, DMSO, cyclohexanone, gamma-butyrolactone, carbonates like propylene carbonate, propylene glycol, benzyl alcohol or their mixtures.

In one preferred embodiment, organic solvent S is a mixture of cyclohexanone, C8-C10 fatty acid dimethylamide and propylene carbonate.

In one preferred embodiment, organic solvent S is a mixture of cyclohexanone, C8-C10 fatty acid dimethylamide and propylene glycol.

In one preferred embodiment, organic solvent S is a mixture of C8-C10 fatty acid dimethylamide and propylene glycol.

In one preferred embodiment, organic solvent S is a mixture of C8-C10 fatty acid dimethylamide and propylene carbonate.

In one preferred embodiment, organic solvent S is a mixture of C8-C10 fatty acid dimethylamide, propylene glycol and propylene carbonate.

Formulations according to the invention normally comprise 20 to 80% by weight of at least one organic solvent S, based on the formulation.

In one embodiment, formulations according to the invention comprise 25 to 70% by weight of at least one organic solvent S, based on the formulation.

In one embodiment, formulations according to the invention comprise 30 to 60% by weight of at least one organic solvent S, based on the formulation.

Formulations according to the invention further comprise at least one alkanol substituted amine D.

Preferably, formulations according to the invention further comprise at least one alkanol substituted tertiary amine D.

Preferred alkanol substituted tertiary amine D are triethanolamine and tetra(2-hydroxypropyl)ethylenediamine.

Especially preferably, said alkanol substituted tertiary amine D is tetra(2-hydroxypropyl)ethylenediamine.

Alkanol substituted amine D, preferably alkanol substituted tertiary amine D, more preferably tetra(2-hydroxypropyl)ethylenediamine, is comprised in formulations according to the invention in amounts from 0.001 to 10 wt %, preferably 0.01 to 2 wt %, more preferably 0.1 to 1 wt %, in each case based on the formulation.

Formulations according to the invention further comprise at least one aryl sulfonic acid E.

In one preferred embodiment, aryl sulfonic acid E is substituted on an aryl ring by at least one alkyl group.

In one preferred embodiment, aryl sulfonic acid E is substituted on an aryl ring by with a linear or branched C4 to C20 alkyl rest.

In one preferred embodiment, aryl sulfonic acid E is a benzene sulfonic acid that is optionally substituted on the aryl ring by at least one alkyl group.

In one preferred embodiment, aryl sulfonic acid E is a benzene sulfonic acid that is optionally substituted on the aryl ring by at least one linear or branched C4 to C20 alkyl rest.

In one preferred embodiment, aryl sulfonic acid E is a benzene sulfonic acid that is substituted on the aryl ring by at least one linear or branched C4 to C20 alkyl rest.

In one preferred embodiment, aryl sulfonic acid E is a benzene sulfonic acid that is substituted on the aryl ring by one linear or branched C4 to C20 alkyl rest.

Formulations according to the invention comprise 0.001 to 10 wt % of at least one aryl sulfonic acid E, preferably 0.01 to 2 wt %, more preferably 0.1 to 1 wt %, in each case based on the formulation Formulations according to the invention further comprise at least one organic tricarboxylic acid F or their salts.

Said organic tricarboxylic acid F is preferably citric acid.

Organic tricarboxylic acid F, preferably citric acid, is comprised in formulations according to the invention in amounts from 0.001 to 10 wt %, preferably 0.01 to 2 wt %, more preferably 0.1 to 1 wt %, in each case based on the formulation.

Formulations according to the invention further comprise at least one nonionic surfactant G different from components c) to f) and h).

In one preferred embodiment, nonionic surfactant G is an alkoxylate.

Suitable alkoxylates include, but are not limited to: polyglycols based on ethylene oxide(s) and propylene oxide(s); fatty oleyl alcohols and polyalkyleneoxide modified peptamethyltrisiloxane. Preferably, the alkoxylate is an alkoxylated alkanol.

In another form, suitable alkoxylates include alkoxylated alkanols, which are usually alkoxylated linear or branched, saturated or unsaturated $C_1$-$C_{20}$ (preferably $C_8$-$C_{20}$) alkanols, preferably ethoxylated, ethoxylated and propoxylated, or ethoxylated and butoxylated, linear or branched, saturated $C_2$-$C_{18}$ (preferably $C_8$-$C_{18}$) alkanols or more preferably, ethoxylated and propoxylated $C_4$-$C_{18}$ (preferably $C_{12}$-$C_{20}$) alkanols. The alkanol unit of the alkoxylated alkanol may be a technical mixture of various chain lengths and isomers. The total number of alkoxy units in the alkoxylated alkanols may range from 5 to 30, preferably from 10 to 25 alkoxy units (e.g. ethyleneoxy and/or propyleneoxy units). The alkoxy units (e.g. EO and PO units) occur preferably in block sequence, in particular as diblock sequence. The polyalkoxylate chain of the alkoxylated alkanols may be terminated by a hydroxy group or a $C_1$ to $C_4$ alkyl, wherein the hydroxy group is preferred. In another form, the alkoxy units (e.g. EO and PO units) occur preferably in block sequence, in particular as diblock sequence, and the polyalkoxylate chain of the alkoxylated alkanols is terminated by a hydroxy group.

In another form preferred suitable alkoxylates are alkoxylated alkanols of the formula (I)

$$R^a\text{—O-(AO)}_m\text{—R}^1 \quad (I)$$

in which $R^a$ is straight-chain or branched alkyl or alkylene with from 1 to 32, preferably 4 to 32, more preferably from 10 to 22, carbon atoms, AO is an ethylene oxide radical, propylene oxide radical, butylene oxide radical, pentylene oxide radical, styrene oxide radical or mixtures of the abovementioned radicals in random or block sequence (wherein a diblock sequence is preferred), m is a number from 1 to 30 and $R^1$ is hydrogen or alkyl with from 1 to 4 carbon atoms.

Particularly preferred alkoxylated alkanols are those of the formula (II)

$$R^b\text{—O-(EO)}_p\text{—(PO)}_q\text{—R}^1 \quad (II)$$

in which $R^b$ is straight-chain or branched alkyl or alkylene with from 1 to 32, preferably 4 to 32, more preferably from 10 to 22, particularly preferably from 6 to 18, carbon atoms, EO is —$CH_2CH_2$—O—, PO is —$CH_2$—$CH(CH_3)$—O— or —$(CH_2)_3$—O—, p is a number from 1 to 20, preferably from 2 to 15, q is a number from 1 to 25, preferably from 5 to 20, and $R^1$ is hydrogen or alkyl with from 1 to 4 carbon atoms, in which the EO and PO units can occur in random sequence or as blocks.

The alkoxylated alkanol may have a solidification temperature of below 50° C., preferably of below 20° C. and in particular of below 0° C.

The composition may comprise at least 5 wt %, at least 10 wt %, preferably at least 15 wt %, and in particular at least 20 wt % of the alkoxylate (e.g. the alkoxylated alkanol). In another form, the composition may comprise at least 0.1 wt %, at least 0.5 wt %, preferably at least 1 wt %, and in particular at least 1.5 wt % of the alkoxylate (e.g. the alkoxylated alkanol). The composition may comprise from 1 to 50 wt %, preferably from 10 to 40 wt %, and in particular from 20 to 35 wt % of the alkoxylate (e.g. the alkoxylated alkanol).

In one form, the alkoxylate is a short chain alkoxylated alkanol, which is an alkoxylated alkanol of the formula I, in which $R^a$ is straight-chain or branched alkyl with from 1 to 8, preferably from 2 to 6, and in particular 3 to 5 carbon atoms. In another form, the alkoxylate is a short chain alkoxylated alkanol, which is an alkoxylated alkanol of the formula II, in which $R^b$ is straight-chain or branched alkyl with from 1 to 8, preferably from 2 to 6, and in particular 3 to 5 carbon atoms. The composition may comprise at least 0.1 wt %, at least 0.5 wt %, preferably at least 1 wt %, and in particular at least 1.5 wt % of the short chain alkoxylated alkanol. The composition may comprise from 0.1 to 20 wt %, preferably from 0.5 to 15 wt %, and in particular from 1 to 8 wt % of the short chain alkoxylated alkanol.

In one embodiment, nonionic surfactant G comprises a block polymer surfactant. The block polymer surfactant may be a diblock polymer or a triblock polymer, wherein the triblock polymer is preferred. The blocks of the block polymer surfactant may be of the A-B or A-B-A type, where the A-B-A type is preferred.

The block polymer surfactant is preferably an alkoxylate block polymer, which may comprise blocks of polyethylene oxide and polypropylene oxide. The alkoxylate block polymers comprise usually at least 20 wt %, preferably at least 30 wt % of polymerized ethylene oxide. In a preferred form, the alkoxylate block polymers comprise at least 10 wt %, preferably at least 15 wt % of polymerized ethylene oxide. The alkoxylate block polymers is preferably a block polymers A-B-A type comprising blocks of polyethylene oxide (block "A") and polypropylene oxide (block "B"). The alkoxylate block polymers are usually terminated on both ends by hydroxyl groups.

The molecular weight of the block polymer surfactant (e.g. the alkoxylate block polymer) may be from 1000 to 30000 Da, preferably from 2000 to 15000 Da.

The block polymer surfactant (e.g. the alkoxylate block polymer) may have a solubility in water at 20° C. of at least 3 wt %, preferably at least 5 wt %, and in particular at least 8 wt %.

The block polymer surfactant (e.g. the alkoxylate block polymer) may have a HLB value in the range from 8 to 22, preferably from 10 to 20. In another form, the block polymer surfactant (e.g. the alkoxylate block polymer) may have a HLB value in the range from 1 to 10, preferably from 1 to 8. The HLB may be calculated by known methods.

In a preferred form, the block polymer surfactant is an alkoxylate block polymer of the A-B-A type comprising blocks of polyethylene oxide (block "A") and polypropylene oxide (block "B"), and wherein the alkoxylate block polymer is terminated on both ends by hydroxyl groups.

In one embodiment, nonionic surfactants G have an HLB value in the range from 6 to 16, preferably from 8 to 16, and in particular from 8 to 14. The HLB may be calculated by known methods. Suitable surfactants include phenol alkoxylates, N-substituted fatty acid amides, amine oxides, esters, sugar-based surfactants, and mixtures thereof. Examples of N-substituted fatty acid amides are fatty acid glucamides or fatty acid alkanolamides. Examples of esters are fatty acid esters, glycerol esters or monoglycerides. Examples of sugar-based surfactants are sorbitans, ethoxylated sorbitans, sucrose and glucose esters or alkylpolyglucosides. The surfactant is usually different from the block polymer surfactant.

A preferred nonionic surfactant is a phenol alkoxylate, preferably a polyarylphenol alkoxylate, more preferably a polyarylphenol ethoxylate, and in particular a tristyrylphenol ethoxylate. The phenol alkoxylate may comprise at least 1 to 70, preferably 3 to 40, and in particular 5 to 30 alkylene oxide units (preferably ethylene oxide units). The phenol alkoxylate has usually a HLB value in the range from 7 to 17, preferably from 9 to 17, and in particular from 11 to 15.

In one embodiment, nonionic surfactants G include alkoxylated, especially ethoxylated, castor oil.

In one embodiment, nonionic surfactants G comprise at least one alkoxylated aliphatic alcohol of formula (A)

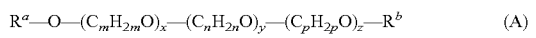

(A)

in which
R$^a$ represents C$_8$-C$_{36}$alkyl, C$_8$-C$_{36}$-alkenyl or a mixture thereof;
R$^b$ represents H or C$_1$-C$_{12}$-alkyl;
m, n, p represent, independently of one another, an integer from 2 to 16;
x, y, z represent, independently of one another, a number from 0 to 50; and
x+y+z corresponds to a value from 2 to 50.

In one embodiment, nonionic surfactants G comprise difunctional EO-PO block copolymers terminating in primary hydroxyl groups with an average molecular weight Mn of1000 to 5000 g/mol, in one embodiment 2000 g/mol to 3000 (calculated from OH number according to DIN 53240)

In one embodiment, nonionic surfactants G comprise liquid nonionic ethoxylated and propoxylated aliphatic C6-C30 aliphatic alcohols, C8 to C20 aliphatic alcohols or C12-18 aliphatic alcohols.

Normally, formulations according to the invention comprise 5 to 60 wt % of at least one nonionic surfactant G, based on the formulation.

In one embodiment, formulations according to the invention comprise 10 to 30 wt % of at least one nonionic surfactant G, based on the formulation.

In one embodiment, formulations according to the invention comprise 30 to 60 wt % of at least one nonionic surfactant G, based on the formulation.

Formulations according to the invention may optionally further comprise additional components.

For example, formulations according to the invention may comprise adjuvants different from nonionic surfactants G.

Adjuvants are compounds, which have a negligible or even no pesticidal activity themselves, and which improve the biological performance of the pesticides on the target. Examples are surfactants, mineral or vegetable oils, and other auxiliaries. Further examples are listed by Knowles, Adjuvants and additives, Agrow Reports DS256, T&F Informa UK, 2006, chapter 5.

Suitable thickeners are polysaccharides (e.g. xanthan gum, carboxymethylcellulose), inorganic clays (organically modified or unmodified), polycarboxylates, and silicates. Suitable bactericides are bronopol and isothiazolinone derivatives such as alkylisothiazolinones and benzisothiazolinones. Suitable anti-freezing agents are ethylene glycol, propylene glycol, urea and glycerin. Suitable anti-foaming agents are silicones, long chain alcohols, and salts of fatty acids. Suitable colorants (e.g. in red, blue, or green) are pigments of low water solubility and water-soluble dyes. Examples are inorganic colorants (e.g. iron oxide, titan oxide, iron hexacyanoferrate) and organic colorants (e.g. alizarin-, azo- and phthalocyanine colorants). Suitable tackifiers or binders are polyvinylpyrrolidones, polyvinylacetates, polyvinyl alcohols, polyacrylates, biological or synthetic waxes, and cellulose ethers.

Further components h) can also include diluents. Diluents are compounds that are not categorized as solvents (thus normally have a boiling point at ambient pressure of 200° C. or higher) and that are chemically inert to the other components at ambient conditions.

Suitable diluents include polyethylene glycol. For example, diluents can be polyethylene glycol with an average molar mass from 200 to 1000 g/mol, preferably 300 to 600 g/mol calculated from the OH number according to DIN 53240.

In one embodiment, formulations according to the invention comprise
a) 0.1 to 15 wt % of afidopyropen,
b) 0.1 to 15 wt % of a cypermethrin like alpha-cypermethrin,
c) 20 to 80 wt % of at least one organic solvent S,
d) 0.001 to 10 wt % of at least one alkanol substituted amine D,
e) 0.001 to 10 wt % of at least one aryl sulfonic acid E or their salts,
f) 0.001 to 10 wt % of at least one organic tricarboxylic acid F or their salts,
g) 5 to 60 wt % of at least one surfactant G different from components c) to f) and h),
h) optionally further components,
wherein the shares of components a) to h) add up to 100% and all percentages being relative to the formulation.

In one embodiment, formulations according to the invention comprise
a) 0.1 to 15 wt % of afidopyropen,
b) 0.1 to 15 wt % of a cypermethrin like alpha-cypermethrin,
c) 20 to 80 wt % of at least one organic solvent S,
d) 0.001 to 10 wt % of at least one alkanol substituted tertiary amine D,
e) 0.001 to 10 wt % of at least one aryl sulfonic acid E or their salts,
f) 0.001 to 10 wt % of at least one organic tricarboxylic acid F or their salts,
g) 5 to 60 wt % of at least one surfactant G different from components c) to f) and h),
h) optionally further components,
wherein the shares of components a) to h) add up to 100% and all percentages being relative to the formulation.

In one embodiment, formulations according to the invention comprise
a) 1 to 10 wt % of afidopyropen,
b) 1 to 10 wt % of a cypermethrin like alpha-cypermethrin,
c) 20 to 80 wt % of at least one organic solvent S,
d) 0.01 to 2 wt % of at least one alkanol substituted tertiary amine D,
e) 0.01 to 2 wt % of at least one aryl sulfonic acid E or their salts, f) 0.01 to 2 wt % of at least one organic tricarboxylic acid F or their salts,
g) 5 to 60 wt % of at least one surfactant G different from components c) to f) and h),
h) optionally further components,
wherein the shares of components a) to h) add up to 100% and all percentages being relative to the formulation.

In one embodiment, formulations according to the invention comprise
a) 1 to 5 wt % of afidopyropen,
b) 1 to 10 wt % of alpha-cypermethrin,
c) 20 to 80 wt % of at least one organic solvent S,
d) 0.01 to 1 wt % of tetra(2-hydroxypropyl)ethylenediamine,
e) 0.01 to 1 wt % of at least one alkyl benzene sulfonic acid E or their salts,
f) 0.01 to 1 wt % of a citric acid F or its salts,
g) 5 to 60 wt % of at least one surfactant different G from components c) to f) and h) and comprising at least one alkoxylated aliphatic alcohol of formula (A),
h) optionally further components,
wherein the shares of components a) to h) add up to 100% and all percentages being relative to the formulation.

In one embodiment, formulations according to the invention comprise
a) 1 to 5 wt % of afidopyropen,
b) 1 to 10 wt % of alpha-cypermethrin,
c) 20 to 80 wt % of at least one organic solvent S,
d) 0.01 to 1 wt % of tetra(2-hydroxypropyl)ethylenediamine,
e) 0.01 to 1 wt % of at least one alkyl benzene sulfonic acid E or their salts,
f) 0.01 to 1 wt % of a citric acid F or its salts,
g) 20 to 60 wt % of at least one surfactant different G from components c) to f) and h) and comprising at least one alkoxylated aliphatic alcohol of formula (A),
h) optionally further components,
wherein the shares of components a) to h) add up to 100% and all percentages being relative to the formulation.

In one embodiment, formulations according to the invention comprise
a) 1 to 5 wt % of afidopyropen,
b) 1 to 10 wt % of alpha-cypermethrin,
c) 20 to 80 wt % of at least one organic solvent S,
d) 0.01 to 1 wt % of tetra(2-hydroxypropyl)ethylenediamine,
e) 0.01 to 1 wt % of at least one alkyl benzene sulfonic acid E or their salts,
f) 0.01 to 1 wt % of a citric acid F or its salts,
g) 30 to 60 wt % of at least one surfactant different G from components c) to f) and h) and comprising at least one alkoxylated aliphatic alcohol of formula (A),
h) optionally further components,
wherein the shares of components a) to h) add up to 100% and all percentages being relative to the formulation.

In one embodiment, formulations according to the invention comprise
a) 1 to 5 wt % of afidopyropen,
b) 1 to 10 wt % of alpha-cypermethrin,
c) 20 to 80 wt % of at least one organic solvent S,
d) 0.01 to 1 wt % of tetra(2-hydroxypropyl)ethylenediamine,
e) 0.01 to 1 wt % of at least one alkyl benzene sulfonic acid E or their salts,
f) 0.01 to 1 wt % of a citric acid F or its salts,
g) 30 to 60 wt % of at least one surfactant different G from components c) to f) and h) and comprising at least one alkoxylated aliphatic alcohol of formula (A),
h1) 10 to 30 wt % of polyethylene glycol with an average molar mass MW of 200 to 1000 g/mol
h2) optionally further components,
wherein the shares of components a) to h) add up to 100% and all percentages being relative to the formulation.

Formulations according to the invention are preferably emulsifiable concentrates (EC).

In another embodiment of the present invention, formulations according to the invention are used for controlling insects.

The formulations of the present invention are suitable for use in protecting crops, plants, plant propagation materials, such as seeds, or soil or water, in which the plants are growing, from attack or infestation by animal pests. Therefore, the present invention also relates to a plant protection method, which comprises contacting crops, plants, plant propagation materials, such as seeds, or soil or water, in which the plants are growing, to be protected from attack or infestation by animal pests, with a pesticidally effective amount of a formulation of the present invention.

The formulations of the present invention are also suitable for use in combating or controlling animal pests. Therefore, the present invention also relates to a method of combating or controlling animal pests, which comprises contacting the animal pests, their habitat, breeding ground, or food supply, or the crops, plants, plant propagation materials, such as seeds, or soil, or the area, material or environment in which the animal pests are growing or may grow, with a pesticidally effective amount of a formulation of the present invention.

The formulations of the present invention are effective through both contact and ingestion. Furthermore, the formulations of the present invention can be applied to any and all developmental stages, such as egg, larva, pupa, and adult.

The formulations of the present invention can be applied as such or in form of compositions comprising them a. Furthermore, the formulations of the present invention can be applied together with a mixing partner as defined above or in form of compositions comprising said mixtures. The components of said mixture can be applied simultaneously, jointly or separately, or in succession, that is immediately one after another and thereby creating the mixture "in situ" on the desired location, e.g. the plant, the sequence, in the case of separate application, generally not having any effect on the result of the control measures.

The application can be carried out both before and after the infestation of the crops, plants, plant propagation materials, such as seeds, soil, or the area, material or environment by the pests.

Suitable application methods include inter alia soil treatment, seed treatment, in furrow application, and foliar application. Soil treatment methods include drenching the soil, drip irrigation (drip application onto the soil), dipping roots, tubers or bulbs, or soil injection. Seed treatment techniques include seed dressing, seed coating, seed dusting, seed soaking, and seed pelleting. In furrow applications typically include the steps of making a furrow in cultivated land, seeding the furrow with seeds, applying the pesticidally active formulation to the furrow, and closing the furrow. Foliar application refers to the application of the pesticidally active formulation to plant foliage, e.g. through spray equipment. For foliar applications, it can be advantageous to modify the behavior of the pests by use of pheromones in combination with the formulations of the present invention. Suitable pheromones for specific crops and pests are known to a skilled person and publicly available from databases of pheromones and semiochemicals, such as http://www.pherobase.com.

As used herein, the term "contacting" includes both direct contact (applying the formulations/compositions directly on the animal pest or plant—typically to the foliage, stem or roots of the plant) and indirect contact (applying the formulations/compositions to the locus, i.e. habitat, breeding ground, plant, seed, soil, area, material or environment in which a pest is growing or may grow, of the animal pest or plant).

The term "animal pest" includes arthropods, gastropods, and nematodes. Preferred animal pests according to the invention are arthropods, preferably insects and arachnids, in particular insects. Insects, which are of particular relevance for crops, are typically referred to as crop insect pests.

The term "crop" refers to both, growing and harvested crops.

The term "plant" includes cereals, e.g. durum and other wheat, rye, barley, triticale, oats, rice, or maize (fodder maize and sugar maize/sweet and field corn); beet, e.g. sugar beet or fodder beet; fruits, such as pomes, stone fruits or soft fruits, e.g. apples, pears, plums, peaches, nectarines, almonds, cherries, papayas, strawberries, raspberries, blackberries or gooseberries; leguminous plants, such as beans, lentils, peas, alfalfa or soybeans; oil plants, such as rapeseed (oilseed rape), turnip rape, mustard, olives, sunflowers, coconut, cocoa beans, castor oil plants, oil palms, ground nuts or soybeans; cucurbits, such as squashes, pumpkins, cucumber or melons; fiber plants, such as cotton, flax, hemp or jute; citrus fruit, such as oranges, lemons, grapefruits or mandarins; vegetables, such as eggplant, spinach, lettuce (e.g. iceberg lettuce), chicory, cabbage, asparagus, cabbages, carrots, onions, garlic, leeks, tomatoes, potatoes, cucurbits or sweet peppers; lauraceous plants, such as avocados, cinnamon or camphor; energy and raw material plants, such as corn, soybean, rapeseed, sugar cane or oil palm; tobacco; nuts, e.g. walnuts; pistachios; coffee; tea; bananas; vines (table grapes and grape juice grape vines); hop; sweet leaf (also called Stevia); natural rubber plants or ornamental and forestry plants, such as flowers (e.g. carnation, petunias, geranium/pelargoniums, pansies and impatiens), shrubs, broad-leaved trees (e.g. poplar) or evergreens, e.g. conifers; eucalyptus; turf; lawn; grass such as grass for animal feed or ornamental uses. Preferred plants include potatoes sugar beets, tobacco, wheat, rye, barley, oats, rice, corn, cotton, soybeans, rapeseed, legumes, sunflowers, coffee or sugar cane; fruits; vines; ornamentals; or vegetables, such as cucumbers, tomatoes, beans or squashes.

The term "cultivated plants" is to be understood as including plants which have been modified by mutagenesis or genetic engineering in order to provide a new trait to a plant or to modify an already present trait.

Mutagenesis includes techniques of random mutagenesis using X-rays or mutagenic chemicals, but also techniques of targeted mutagenesis, in order to create mutations at a specific locus of a plant genome. Targeted mutagenesis techniques frequently use oligonucleotides or proteins like CRISPR/Cas, zinc-finger nucleases, TALENs or meganucleases to achieve the targeting effect. Genetic engineering usually uses recombinant DNA techniques to create modifications in a plant genome which under natural circumstances cannot readily be obtained by cross breeding, mutagenesis or natural recombination. Typically, one or more genes are integrated into the genome of a plant in order to add a trait or improve a trait. These integrated genes are also referred to as transgenes in the art, while plant comprising such transgenes are referred to as transgenic plants. The process of plant transformation usually produces several transformation events, which differ in the genomic locus in which a transgene has been integrated. Plants comprising a specific transgene on a specific genomic locus are usually described as comprising a specific "event", which is referred to by a specific event name. Traits which have been introduced in plants or have been modified include in particular herbicide tolerance, insect resistance, increased yield and tolerance to abiotic conditions, like drought.

Herbicide tolerance has been created by using mutagenesis as well as using genetic engineering. Plants which have been rendered tolerant to acetolactate synthase (ALS) inhibitor herbicides by conventional methods of mutagenesis and breeding comprise plant varieties commercially available under the name Clearfield®. However, most of the herbicide tolerance traits have been created via the use of transgenes. Herbicide tolerance has been created to glyphosate, glufosinate, 2,4-D, dicamba, oxynil herbicides, like bromoxynil and ioxynil, sulfonylurea herbicides, ALS inhibitor herbicides and 4-hydroxyphenylpyruvate dioxygenase (HPPD) inhibitors, like isoxaflutole and mesotrione. Transgenes which have been used to provide herbicide tolerance traits comprise: for tolerance to glyphosate: cp4 epsps, epsps grg23ace5, mepsps, 2mepsps, gat4601, gat4621 and goxv247, for tolerance to glufosinate: pat and bar, for tolerance to 2,4-D: aad-1 and aad-12, for tolerance to dicamba: dmo, for tolerance to oxynil herbicides: bxn, for tolerance to sulfonylurea herbicides: zm-hra, csr1-2, gm-hra, S4-HrA, for tolerance to ALS inhibitor herbicides: csr1-2, for tolerance to HPPD inhibitor herbicides: hppdPF, W336 and avhppd-03.

Transgenic corn events comprising herbicide tolerance genes are for example, but not excluding others, DAS40278, MON801, MON802, MON809, MON810, MON832, MON87411, MON87419, MON87427, MON88017, MON89034, NK603, GA21, MZHG0JG, HCEM485, VCO-Ø1981-5, 676, 678, 680, 33121, 4114, 59122, 98140, Bt10, Bt176, CBH-351, DBT418, DLL25, MS3, MS6, MZIR098, T25, TC1507 and TC6275.

Transgenic soybean events comprising herbicide tolerance genes are for example, but not excluding others, GTS 40-3-2, MON87705, MON87708, MON87712, MON87769, MON89788, A2704-12, A2704-21, A5547-127, A5547-35, DP356043, DAS44406-6, DAS68416-4, DAS-81419-2, GU262, SYHTØH2, W62, W98, FG72 and CV127.

Transgenic cotton events comprising herbicide tolerance genes are for example, but not excluding others, 19-51a, 31707, 42317, 81910, 281-24-236, 3006-210-23, BXN10211, BXN10215, BXN10222, BXN10224, MON1445, MON1698, MON88701, MON88913, GHB119, GHB614, LLCotton25, T303-3 and T304-40.

Transgenic canola events comprising herbicide tolerance genes are for example, but not excluding others, MON88302, HCR-1, HCN10, HCN28, HCN92, MS1, MS8, PHY14, PHY23, PHY35, PHY36, RF1, RF2 and RF3.

Insect resistance has mainly been created by transferring bacterial genes for insecticidal proteins to plants. Transgenes which have most frequently been used are toxin genes of *Bacillus* spec. and synthetic variants thereof, like cry1A, cry1Ab, cry1Ab-Ac, cry1Ac, cry1A.105, cry1F, cry1Fa2, cry2Ab2, cry2Ae, mcry3A, ecry3.1Ab, cry3Bb1, cry34Ab1, cry35Ab1, cry9C, vip3A(a), vip3Aa20. However, also genes of plant origin have been transferred to other plants. In particular genes coding for protease inhibitors, like CpTI and pinII. A further approach uses transgenes in order to produce double stranded RNA in plants to target and down-regulate insect genes. An example for such a transgene is dvsnf7.

Transgenic corn events comprising genes for insecticidal proteins or double stranded RNA are for example, but not excluding others, Bt10, Bt11, Bt176, MON801, MON802, MON809, MON810, MON863, MON87411, MON88017, MON89034, 33121, 4114, 5307, 59122, TC1507, TC6275, CBH-351, MIR162, DBT418 and MZIR098.

Transgenic soybean events comprising genes for insecticidal proteins are for example, but not excluding others, MON87701, MON87751 and DAS-81419.

Transgenic cotton events comprising genes for insecticidal proteins are for example, but not excluding others, SGK321, MON531, MON757, MON1076, MON15985, 31707, 31803, 31807, 31808, 42317, BNLA-601, Event1, COT67B, COT102, T303-3, T304-40, GFM Cry1A, GK12, MLS 9124, 281-24-236, 3006-210-23, GHB119 and SGK321.

Increased yield has been created by increasing ear biomass using the transgene athb17, being present in corn event MON87403, or by enhancing photosynthesis using the transgene bbx32, being present in the soybean event MON87712.

Cultivated plants comprising a modified oil content have been created by using the transgenes: gm-fad2-1, Pj.D6D, Nc.Fad3, fad2-1A and fatb1-A. Soybean events comprising at least one of these genes are: 260-05, MON87705 and MON87769.

Tolerance to abiotic conditions, in particular to tolerance to drought, has been created by using the transgene cspB, comprised by the corn event MON87460 and by using the transgene Hahb-4, comprised by soybean event IND-ØØ41Ø-5.

Traits are frequently combined by combining genes in a transformation event or by combining different events during the breeding process. Preferred combination of traits are herbicide tolerance to different groups of herbicides, insect tolerance to different kind of insects, in particular tolerance to lepidopteran and coleopteran insects, herbicide tolerance with one or several types of insect resistance, herbicide tolerance with increased yield as well as a combination of herbicide tolerance and tolerance to abiotic conditions.

Plants comprising singular or stacked traits as well as the genes and events providing these traits are well known in the art. For example, detailed information as to the mutagenized or integrated genes and the respective events are available from websites of the organizations "International Service for the Acquisition of Agri-biotech Applications (ISAAA)" (http://www.isaaa.org/gmapprovaldatabase) and the "Center for Environmental Risk Assessment (CERA)" (http://cera-gmc.org/GMCropDatabase), Further information on specific events and methods to detect them can be found for canola events MS1, MS8, RF3, GT73, MON88302, KK179 in WO01/031042, WO01/041558, WO01/041558, WO02/036831, WO11/153186, WO13/003558, for cotton events MON1445, MON15985, MON531(MON15985), LLCotton25, MON88913, COT102, 281-24-236, 3006-210-23, COT67B, GHB614, T304-40, GHB119, MON88701, 81910 in WO02/034946, WO02/100163, WO02/100163, WO03/013224, WO04/072235, WO04/039986, WO05/103266, WO05/103266, WO06/128573, WO07/017186, WO08/122406, WO08/151780, WO12/134808, WO13/112527, for corn events GA21, MON810, DLL25, TC1507, MON863, MIR604, LY038, MON88017, 3272, 59122, NK603, MIR162, MON89034, 98140, 32138, MON87460, 5307, 4114, MON87427, DAS40278, MON87411, 33121, MON87403, MON87419 in WO98/044140, US02/102582, US03/126634, WO04/099447, WO04/011601, WO05/103301, WO05/061720, WO05/059103, WO06/098952, WO06/039376, US2007/292854, WO07/142840, WO07/140256, WO08/112019, WO09/103049, WO09/111263, WO10/077816, WO11/084621, WO11/062904, WO11/022469, WO13/169923, WO14/116854, WO15/053998, WO15/142571, for potato events E12, F10, J3, J55, V11, X17, Y9 in WO14/178910, WO14/178913, WO14/178941, WO14/179276, WO16/183445, WO17/062831, WO17/062825, for rice events LLRICE06, LLRICE601, LLRICE62 in WO00/026345, WO00/026356, WO00/026345 for soybean events H7-1, MON89788, A2704-12, A5547-127, DP305423, DP356043, MON87701, MON87769, CV127, MON87705, DAS68416-4, MON87708, MON87712, SYHT0H2, DAS81419, DAS81419xDAS44406-6, MON87751 in WO04/074492, WO06/130436, WO06/108674, WO06/108675, WO08/054747, WO08/002872, WO09/064652, WO09/102873, WO10/080829, WO10/037016, WO11/066384, WO11/034704, WO12/051199, WO12/082548, WO13/016527, WO13/016516, WO14/201235.

The use of compositions according to the invention on cultivated plants may result in effects which are specific to a cultivated plant comprising a certain gene or event. These effects might involve changes in growth behavior or changed resistance to biotic or abiotic stress factors. Such effects may in particular comprise enhanced yield, enhanced resistance or tolerance to insects, nematodes, fungal, bacterial, mycoplasma, viral or viroid pathogens as well as early vigor, early or delayed ripening, cold or heat tolerance as well as changed amino acid or fatty acid spectrum or content.

It has surprisingly been found that the pesticidal activity of the formulations of the present invention may be enhanced by the insecticidal trait of a modified plant. Furthermore, it has been found that the formulations of the present invention are suitable for preventing insects to become resistant to the insecticidal trait or for combating pests, which already have become resistant to the insecticidal trait of a modified plant. Moreover, the formulations of the present invention are suitable for combating pests, against which the insecticidal trait is not effective, so that a complementary insecticidal activity can advantageously be used.

The term "plant propagation material" refers to all the generative parts of the plant such as seeds and vegetative plant material such as cuttings and tubers (e.g. potatoes), which can be used for the multiplication of the plant. This includes seeds, roots, fruits, tubers, bulbs, rhizomes, shoots, sprouts and other parts of plants. Seedlings and young plants, which are to be transplanted after germination or after emergence from soil, may also be included. These plant propagation materials may be treated prophylactically with a plant protection formulation either at or before planting or transplanting.

The term "seed" embraces seeds and plant propagules of all kinds including but not limited to true seeds, seed pieces, suckers, corms, bulbs, fruit, tubers, grains, cuttings, cut shoots and the like, and means in a preferred embodiment true seeds.

In general, "pesticidally effective amount" means the amount of active ingredient needed to achieve an observable effect on growth, including the effects of necrosis, death, retardation, prevention, and removal, destruction, or otherwise diminishing the occurrence and activity of the target organism. The pesticidally effective amount can vary for the various formulations/compositions used in the invention. A pesticidally effective amount of the compositions will also vary according to the prevailing conditions such as desired pesticidal effect and duration, weather, target species, locus, mode of application, and the like.

In the case of soil treatment, in furrow application or of application to the pests dwelling place or nest, the quantity of active ingredient ranges from 0.0001 to 500 g per 100 m$^2$, preferably from 0.001 to 20 g per 100 m$^2$.

For use in treating crop plants, e.g. by foliar application, the rate of application of the active ingredients of this invention may be in the range of 0.0001 g to 4000 g per hectare, e.g. from 1 g to 2 kg per hectare or from 1 g to 750 g per hectare, desirably from 1 g to 100 g per hectare, more desirably from 10 g to 50 g per hectare, e.g., 10 to 20 g per hectare, 20 to 30 g per hectare, 30 to 40 g per hectare, or 40 to 50 g per hectare.

The formulations of the invention are particularly suitable for use in the treatment of seeds in order to protect the seeds from insect pests, in particular from soil-living insect pests, and the resulting seedling's roots and shoots against soil pests and foliar insects. The invention therefore also relates to a method for the protection of seeds from insects, in particular from soil insects, and of the seedling's roots and shoots from insects, in particular from soil and foliar insects, said method comprising treating the seeds before sowing and/or after pregermination with a formulation of the invention. The protection of the seedling's roots and shoots is preferred. More preferred is the protection of seedling's shoots from piercing and sucking insects, chewing insects and nematodes.

The term "seed treatment" comprises all suitable seed treatment techniques known in the art, such as seed dressing, seed coating, seed dusting, seed soaking, seed pelleting, and in-furrow application methods. Preferably, the seed treatment application of the active compound is carried out by spraying or by dusting the seeds before sowing of the plants and before emergence of the plants.

The invention also comprises seeds coated with or containing the active formulation. The term "coated with and/or containing" generally signifies that the active ingredient is for the most part on the surface of the propagation product at the time of application, although a greater or lesser part of the ingredient may penetrate into the propagation product, depending on the method of application. When the said propagation product is (re)planted, it may absorb the active ingredient.

Suitable seed is for example seed of cereals, root crops, oil crops, vegetables, spices, ornamentals, for example seed of durum and other wheat, barley, oats, rye, maize (fodder maize and sugar maize/sweet and field corn), soybeans, oil crops, crucifers, cotton, sunflowers, bananas, rice, oilseed rape, turnip rape, sugarbeet, fodder beet, eggplants, potatoes, grass, lawn, turf, fodder grass, tomatoes, leeks, pumpkin/squash, cabbage, iceberg lettuce, pepper, cucumbers, melons, *Brassica* species, melons, beans, peas, garlic, onions, carrots, tuberous plants such as potatoes, sugar cane, tobacco, grapes, petunias, geranium/pelargoniums, pansies and impatiens.

The invention therefore also relates to seed to which a formulation of the invention has been applied. The amount of the active ingredients of formulations the invention or the agriculturally useful salt thereof will in general vary from 0.1 g to 10 kg per 100 kg of seed, preferably from 1 g to 5 kg per 100 kg of seed, in particular from 1 g to 1000 g per 100 kg of seed. For specific crops such as lettuce the rate can be higher.

The formulations of the invention may also be used for improving the health of a plant. Therefore, the invention also relates to a method for improving plant health by treating a plant, plant propagation material and/or the locus where the plant is growing or is to grow with an effective and non-phytotoxic amount of a formulation of the invention.

As used herein "an effective and non-phytotoxic amount" means that the formulation is used in a quantity which allows to obtain the desired effect but which does not give rise to any phytotoxic symptom on the treated plant or on the plant grown from the treated propagule or treated soil.

The terms "plant" and "plant propagation material" are defined above.

"Plant health" is defined as a condition of the plant and/or its products which is determined by several aspects alone or in combination with each other such as yield (for example increased biomass and/or increased content of valuable ingredients), quality (for example improved content or composition of certain ingredients or shelf life), plant vigour (for example improved plant growth and/or greener leaves ("greening effect"), tolerance to abiotic (for example drought) and/or biotic stress (for example disease) and production efficiency (for example, harvesting efficiency, processability).

The above identified indicators for the health condition of a plant may be interdependent and may result from each other. Each indicator is defined in the art and can be determined by methods known to a skilled person.

The formulations of the invention are also suitable for use against non-crop insect pests. For use against said non-crop pests, formulations of the invention can be used as bait composition, gel, general insect spray, aerosol, as ultra-low volume application and bed net (impregnated or surface applied). Furthermore, drenching and rodding methods can be used.

As used herein, the term "non-crop insect pest" refers to pests, which are particularly relevant for non-crop targets, such as ants, termites, wasps, flies, ticks, mosquitos, crickets, or cockroaches.

The bait can be a liquid, a solid or a semisolid preparation (e.g. a gel). The bait employed in the composition is a product, which is sufficiently attractive to incite insects such as ants, termites, wasps, flies, mosquitos, crickets etc. or cockroaches to eat it. The attractiveness can be manipulated by using feeding stimulants or sex pheromones. Food stimulants are chosen, for example, but not exclusively, from animal and/or plant proteins (meat-, fish- or blood meal, insect parts, egg yolk), from fats and oils of animal and/or plant origin, or mono-, oligo- or polyorganosaccharides, especially from sucrose, lactose, fructose, dextrose, glucose, starch, pectin or even molasses or honey. Fresh or decaying parts of fruits, crops, plants, animals, insects or specific parts thereof can also serve as a feeding stimulant. Sex pheromones are known to be more insect specific. Specific pheromones are described in the literature (e.g. http://www.pherobase.com), and are known to those skilled in the art.

For use in bait compositions, the typical content of active ingredient is from 0.001 weight % to 15 weight %, desirably from 0.001 weight % to 5% weight % of active compound.

The formulations of the invention and its respective compositions can also be used in mosquito and fumigating coils, smoke cartridges, vaporizer plates or long-term vaporizers and also in moth papers, moth pads or other heat-independent vaporizer systems.

Methods to control infectious diseases transmitted by insects (e.g. malaria, dengue and yellow fever, lymphatic filariasis, and leishmaniasis) with formulations of the invention and its respective compositions also comprise treating surfaces of huts and houses, air spraying and impregnation of curtains, tents, clothing items, bed nets, tsetse-fly trap or the like. Insecticidal compositions for application to fibers, fabric, knitgoods, nonwovens, netting material or foils and tarpaulins preferably comprise a mixture including the insecticide, optionally a repellent and at least one binder.

The formulations of the invention and its compositions can be used for protecting wooden materials such as trees, board fences, sleepers, frames, artistic artifacts, etc. and buildings, but also construction materials, furniture, leathers, fibers, vinyl articles, electric wires and cables etc. from ants and/or termites, and for controlling ants and termites from doing harm to crops or human being (e.g. when the pests invade into houses and public facilities).

Customary application rates in the protection of materials are, for example, from 0.001 g to 2000 g or from 0.01 g to 1000 g of active compound per $m^2$ treated material, desirably from 0.1 g to 50 g per $m^2$.

Insecticidal compositions for use in the impregnation of materials typically contain from 0.001 to 95 weight %, preferably from 0.1 to 45 weight %, and more preferably from 1 to 25 weight % of at least one repellent and/or insecticide.

The formulations of the invention are especially suitable for efficiently combating animal pests such as arthropods, gastropods and nematodes including but not limited to:

insects from the order of Lepidoptera, for example Achroia grisella, Acleris spp. such as A. fimbriana, A. gloverana, A. variana; Acrolepiopsis assectella, Acronicta major, Adoxophyes spp. such as A. cyrtosema, A. orana; Aedia leucomelas, Agrotis spp. such as A. exclamationis, A. fucosa, A. ipsilon, A. orthogoma, A. segetum, A. subterranea; Alabama argillacea, Aleurodicus dispersus, Alsophila pometaria, Ampelophaga rubiginosa, Amyelois transitella, Anacampsis sarcitella, Anagasta kuehniella, Anarsia lineatella, Anisota sanatoria, Antheraea pernyi, Anticarsia (=Thermesia) spp. such as A. gemmatalis; Apamea spp., Aproaerema modicella, Archips spp. such as A. argyrospila, A. fuscocupreanus, A. rosana, A. xyloseanus; Argyresthia conjugella, Argyroploce spp., Argyrotaenia spp. such as A. velutinana; Athetis mindara, Austroasca viridigrisea, Autographa gamma, Autographa nigrisigna, Barathra brassicae, Bedellia spp., Bonagota salubricola, Borbo cinnara, Bucculatrix thurberiella, Bupalus piniarius, Busseola spp., Cacoecia spp. such as C. murinana, C. podana; Cactoblastis cactorum, Cadra cautella, Calingo braziliensis, Caloptilis theivora, Capua reticulana, Carposina spp. such as C. niponensis, C. sasakii; Cephus spp., Chaetocnema aridula, Cheimatobia brumata, Chilo spp. such as C. Indicus, C. suppressalis, C. partellus; Choreutis pariana, Choristoneura spp. such as C. conflictana, C. fumiferana, C. longicellana, C. murinana, C. occidentalis, C. rosaceana; Chrysodeixis (=Pseudoplusia) spp. such as C. eriosoma, C. includens; Cirphis unipuncta, Clysia ambiguella, Cnaphalocerus spp., Cnaphalocrocis medinalis, Cnephasia spp., Cochylis hospes, Coleophora spp., Colias eurytheme, Conopomorpha spp., Conotrachelus spp., Copitarsia spp., Corcyra cephalonica, Crambus caliginosellus, Crambus teterrellus, Crocidosema (=Epinotia) aporema, Cydalima (=Diaphania) perspectalis, Cydia (=Carpocapsa) spp. such as C. pomonella, C. latiferreana; Dalaca noctuides, Datana integerrima, Dasychira pinicola, Dendrolimus spp. such as D. pini, D. spectabilis, D. sibiricus; Desmia funeralis, Diaphania spp. such as D. nitidalis, D. hyalinata; Diatraea grandiosella, Diatraea saccharalis, Diphthera festiva, Earias spp. such as E. insulana, E. vittella; Ecdytolopha aurantianu, Egira (=Xylomyges) curialis, Elasmopalpus lignosellus, Eldana saccharin, Endopiza viteana, Ennomos subsignaria, Eoreuma loftini, Ephestia spp. such as E. cautella, E. elutella, E. kuehniella; Epinotia aporema, Epiphyas postvittana, Erannis tiliaria, Erionota thrax, Etiella spp., Eulia spp., Eupoecilia ambiguella, Euproctis chrysorrhoea, Euxoa spp., Evetria bouliana, Faronta albilinea, Feltia spp. such as F. subterranean; Galleria mellonella, Gracillaria spp., Grapholita spp. such as G. funebrana, G. molesta, G. inopinata; Halysidota spp., Harrisina americana, Hedylepta spp., Helicoverpa spp. such as H. armigera (=Heliothis armigera), H. zea (=Heliothis zea); Heliothis spp. such as H. assulta, H. subflexa, H. virescens; Hellula spp. such as H. undalis, H. rogatalis; Helocoverpa gelotopoeon, Hemileuca oliviae, Herpetogramma licarsisalis, Hibernia defoliaria, Hofmannophila pseudospretella, Homoeosoma electellum, Homona magnanima, Hypena scabra, Hyphantria cunea, Hyponomeuta padella, Hyponomeuta malinellus, Kakivoria flavofasciata, Keiferia lycopersicella, Lambdina fiscellaria, Lambdina fiscellaria lugrubosa, Lamprosema indicata, Laspeyresia molesta, Leguminivora glycinivorella, Lerodea eufala, Leucinodes orbonalis, Leucoma salicis, Leucoptera spp. such as L. coffeella, L. scitella; Leuminivora lycinivorella, Lithocolletis blancardella, Lithophane antennata, Llattia octo (=Amyna axis), Lobesia botrana, Lophocampa spp., Loxagrotis albicosta, Loxostege spp. such as L. sticticalis, L. cereralis; Lymantria spp. such as L. dispar, L. monacha; Lyonetia clerkella, Lyonetia prunifoliella, Malacosoma spp. such as M. americanum, M. californicum, M. constrictum, M. neustria; Mamestra spp. such as M. brassicae, M. configurata; Mamstra brassicae, Manduca spp. such as M. quinquemaculata, M. sexta; Marasmia spp, Marmara spp., Maruca testulalis, Megalopyge lanata, Melanchra picta, Melanitis leda, Mocis spp. such as M. lapites, M. repanda; Mocis latipes, Monochroa fragariae, Mythimna separata, Nemapogon cloacella, Neoleucinodes elegantalis, Nepytia spp., Nymphula spp., Oiketicus spp., Omiodes indicata, Omphisa anastomosalis, Operophtera brumata, Orgyia pseudotsugata, Oria spp., Orthaga thyrisalis, Ostrinia spp. such as O. nubilalis, Oulema oryzae, Paleacrita vernata, Panolis flammea, Parnara spp., Papaipema nebris, Papilio cresphontes, Paramyelois transitella, Paranthrene regalis, Paysandisia archon, Pectinophora spp. such as P. gossypiella; Peridroma saucia, Perileucoptera spp., such as P. coffeella; Phalera bucephala, Phryganidia californica, Phthorimaea spp. such as P. operculella; Phyllocnistis citrella, Phyllonorycter spp. such as P. blancardella, P. crataegella, P. issikii, P. ringoniella; Pieris spp. such as P. brassicae, P. rapae, P. napi; Pilocrocis tripunctata, Plathypena scabra, Platynota spp. such as P. flavedana, P. idaeusalis, P. stultana; Platyptilia carduidactyla, Plebejus argus, Plodia interpunctella, Plusia spp, Plutella maculipennis, Plutella xylostella, Pontia protodica, Prays spp., Prodenia spp., Proxenus lepigone, Pseudaletia spp. such as P. sequax, P. unipuncta; Pyrausta nubilalis, Rachiplusia nu, Richia albicosta, Rhizobius ventralis, Rhyacionia frustrana, Sabulodes aegrotata, Schizura concinna, Schoenobius spp., Schreckensteinia festaliella, Scirpophaga spp. such as *S. incertulas, S. innotata; Scotia segetum, Sesamia* spp. such as *S. inferens, Seudyra subflava, Sitotroga cerealella, Sparganothis pilleriana, Spilonota lechriaspis, S. ocellana, Spodoptera (=Lamphygma)* spp. such as *S. cosmoides, S. eridania, S. exigua, S. frugiperda, S. latisfascia, S. littoralis, S. litura, S. omithogalli; Stigmella* spp., *Stomopteryx subsecivella, Strymon bazochii, Sylepta derogata, Synanthedon* spp. such as *S. exitiosa, Tecia solanivora, Telehin licus, Thaumatopoea pityocampa, Thaumatotibia (=Cryptophlebia) leucotreta, Thaumetopoea pityocampa, Thecla* spp., *Theresimima ampelophaga, Thyrinteina* spp, *Tildenia inconspicuella, Tinea* spp. such as *T. cloacella, T. pellionella; Tineola bisselliella, Tortrix* spp. such as *T. viridana; Trichophaga tapetzella, Trichoplusia* spp. such as *T. ni; Tuta (=Scrobipalpula) absoluta, Udea* spp. such as *U. rubigalis, U. rubigalis; Virachola* spp., *Yponomeuta padella*, and *Zeiraphera canadensis;* insects from the order of Coleoptera, for example *Acalymma vittatum, Acanthoscehdes obtectus, Adoretus* spp., *Agelastica alni, Agrilus* spp. such as *A. anxius, A. planipennis, A. sinuatus; Agriotes* spp. such as *A. fuscicollis, A. lineatus, A. obscurus; Alphitobius diaperinus, Amphimallus solstitialis, Anisandrus dispar, Anisoplia austriaca, Anobium punctatum, Anomala corpulenta, Anomala rufocuprea, Anoplophora* spp. such as *A. glabripennis; Anthonomus* spp. such as *A. eugenii, A. grandis, A. pomorum; Anthrenus* spp., *Aphthona euphoridae, Apion* spp., *Apogonia* spp., *Athous haemorrhoidalis, Atomaria* spp. such as *A. linearis; Attagenus* spp., *Aulacophora femoralis, Blastophagus piniperda, Blitophaga undata, Bruchidius obtectus, Bruchus* spp. such as *B. lentis, B. pisorum, B. rufimanus; Byctiscus betulae, Callidiellum rufipenne, Callopistria floridensis, Callosobruchus chinensis, Cameraria ohridella, Cassida nebulosa, Cerotoma trifurcata, Cetonia aurata, Ceuthorhynchus* spp. such as *C. assimilis, C. napi; Chaetocnema tibialis, Cleonus mendicus, Conoderus* spp. such as *C. vespertinus; Conotrachelus nenuphar, Cosmopolites* spp., *Costelytra zealandica, Crioceris asparagi, Cryptolestes ferrugineus, Cryptorhynchus lapathi, Ctenicera* spp. such as *C. destructor; Curculio* spp., *Cylindrocopturus* spp., *Cyclocephala* spp., *Dactylispa balyi, Dectes texanus, Dermestes* spp., *Diabrotica* spp. such as *D. undecimpunctata, D. speciosa, D. longicornis, D. semipunctata, D. virgifera; Diaprepes abbreviates, Dichocrocis* spp., *Dicladispa armigera, Diloboderus abderus, Diocalandra frumenti (Diocalandra stigmaticollis), Enaphalodes rufulus, Epilachna* spp. such as *E. varivestis, E. vigintioctomaculata; Epitrix* spp. such as *E. hirtipennis, E. similaris; Eutheola humilis, Eutinobothrus brasiliensis, Faustinus cubae, Gibbium psylloides, Gnathocerus cornutus, Hellula undalis, Heteronychus arator, Hylamorpha elegans, Hylobius abietis, Hylotrupes bajulus, Hypera* spp. such as *H. brunneipennis, H. postica; Hypomeces squamosus, Hypothenemus* spp., *Ips typographus, Lachnosterna consanguinea, Lasioderma serricorne, Latheticus oryzae, Lathridius* spp., *Lema* spp. such as *L. bilineata, L. melanopus; Leptinotarsa* spp. such as *L. decemlineata, Leptispa pygmaea, Limonius californicus, Lissorhoptrus oryzophilus, Lixus* spp., *Luperodes* spp., *Lyctus* spp. such as *L. bruneus; Liogenys fuscus, Macrodactylus* spp. such as *M. subspinosus; Maladera matrida, Megaplatypus mutates, Megascelis* spp., *Melanotus communis, Meligethes* spp. such as *M. aeneus; Melolontha* spp. such as *M. hippocastani, M. melolontha; Metamasius hemipterus, Microtheca* spp., *Migdolus* spp. such as *M. fryanus, Monochamus* spp. such as *M. alternatus; Naupactus xanthographus, Niptus hololeucus, Oberia brevis, Oemona hirta, Oryctes rhinoceros, Oryzaephilus surinamensis, Oryzaphagus oryzae, Otiorrhynchus sulcatus, Otiorrhynchus ovatus, Otiorrhynchus sulcatus, Oulema melanopus, Oulema oryzae, Oxycetonia jucunda, Phaedon* spp. such as *P. brassicae, P. cochleariae; Phoracantha recurva, Phyllobius pyri, Phyllopertha horticola, Phyllophaga* spp. such as *P. helleri; Phyllotreta* spp. such as *P. chrysocephala, P. nemorum, P. striolata, P. vittula; Phyllopertha horticola, Popillia japonica, Premnotrypes* spp., *Psacothea hilaris, Psylliodes chrysocephala, Prostephanus truncates, Psylliodes* spp., *Ptinus* spp., *Pulga saltona, Rhizopertha dominica, Rhynchophorus* spp. such as *R. billineatus, R. ferrugineus, R. palmarum, R. phoenicis, R. vulneratus; Saperda candida, Scolytus schevyrewi, Scyphophorus acupunctatus, Sitona lineatus, Sitophilus* spp. such as *S. granaria, S. oryzae, S. zeamais; Sphenophorus* spp. such as *S. levis; Stegobium paniceum, Sternechus* spp. such as *S. subsignatus; Strophomorphus ctenotus, Symphyletes* spp., *Tanymecus* spp., *Tenebrio molitor, Tenebrioides mauretanicus, Tribolium* spp. such as *T. castaneum; Trogoderma* spp., *Tychius* spp., *Xylotrechus* spp. such as *X. pyrrhoderus;* and, *Zabrus* spp. such as *Z. tenebrioides;* insects from the order of Diptera e.g. *Aedes* spp. such as *A. aegypti, A. albopictus, A. vexans; Anastrepha ludens, Anopheles* spp. such as *A. albimanus, A. crucians, A. freeborni, A. gambiae, A. leucosphyrus, A. maculipennis, A. minimus, A. quadrimaculatus, A. sinensis; Bactrocera invadens, Bibio hortulanus, Calliphora erythrocephala, Calliphora vicina, Ceratitis capitata, Chrysomyia* spp. such as *C. bezziana, C. hominivorax, C. macellaria; Chrysops atlanticus, Chrysops discalis, Chrysops silacea, Cochliomyia* spp. such as *C. hominivorax; Contarinia* spp. such as *C. sorghicola; Cordylobia anthropophaga, Culex* spp. such as *C. nigripalpus, C. pipiens, C. quinquefasciatus, C. tarsalis, C. tritaeniorhynchus; Culicoides furens, Culiseta inornata, Culiseta melanura, Cuterebra* spp., *Dacus cucurbitae, Dacus oleae, Dasineura brassicae, Dasineura oxycoccana, Delia* spp. such as *D. antique, D. coarctata, D. platura, D. radicum; Dermatobia hominis, Drosophila* spp. such as *D. suzukii, Fannia* spp. such as *F. canicularis; Gastraphilus* spp. such as *G. intestinalis; Geomyza tipunctata, Glossina* spp. such as *G. fuscipes, G. morsitans, G. palpalis, G. tachinoides; Haematobia irritans, Haplodiplosis equestris, Hippelates* spp., *Hylemyia* spp. such as *H. platura; Hypoderma* spp. such as *H. lineata; Hyppobosca* spp., *Hydrellia philippina, Leptoconops torrens, Liriomyza* spp. such as *L. sativae, L. trifolii; Lucilia* spp. such as *L. caprina, L. cuprina, L. sericata; Lycoria pectoralis, Mansonia titillanus, Mayetiola* spp. such as *M. destructor; Musca* spp. such as *M. autumnalis, M. domestica; Muscina stabulans, Oestrus* spp. such as *O. ovis; Opomyza florum, Oscinella* spp. such as *O. frit; Orseolia oryzae, Pegomya hysocyami, Phlebotomus argentipes, Phorbia* spp. such as *P. antiqua, P. brassicae, P. coarctata; Phytomyza gymnostoma, Prosimulium mix-*

*tum, Psila rosae, Psorophora columbiae, Psorophora discolor, Rhagoletis* spp. such as *R. cerasi, R. cingulate, R. indifferens, R. mendax, R. pomonella; Rivellia quadrifasciata, Sarcophaga* spp. such as *S. haemorrhoidalis; Simulium vittatum, Sitodiplosis mosellana, Stomoxys* spp. such as *S. calcitrans; Tabanus* spp. such as *T. atratus, T. bovinus, T. lineola, T. similis; Tannia* spp., *Thecodiplosis japonensis, Tipula oleracea, Tipula paludosa*, and *Wohlfahrtia* spp;

insects from the order of Thysanoptera for example, *Baliothrips biformis, Dichromothrips corbetti, Dichromothrips* ssp., *Echinothrips americanus, Enneothrips flavens, Frankliniella* spp. such as *F. fusca, F. occidentalis, F. tritici; Heliothrips* spp., *Hercinothrips femoralis, Kakothrips* spp., *Microcephalothrips abdominalis, Neohydatothrips samayunkur, Pezothrips kellyanus, Rhipiphorothrips cruentatus, Scirtothrips* spp. such as *S. citri, S. dorsalis, S. perseae; Stenchaetothrips* spp, *Taeniothrips cardamoni, Taeniothrips inconsequens, Thrips* spp. such as *T. imagines, T. hawaiiensis, T. oryzae, T. palmi, T. parvispinus, T. tabaci*;

insects from the order of Hemiptera for example, *Acizzia jamatonica, Acrosternum* spp. such as *A. hilare; Acyrthosipon* spp. such as *A. onobrychis, A. pisum; Adelges laricis, Adelges tsugae, Adelphocoris* spp., such as *A. rapidus, A. superbus; Aeneolamia* spp., *Agonoscena* spp., *Aulacorthum solani, Aleurocanthus woglumi, Aleurodes* spp., *Aleurodicus disperses, Aleurolobus barodensis, Aleurothrixus* spp., *Amrasca* spp., *Anasa tristis, Antestiopsis* spp., *Anuraphis cardui, Aonidiella* spp., *Aphanostigma piri, Aphidula nasturtii, Aphis* spp. such as *A. craccivora, A. fabae, A. forbesi, A. gossypii, A. grossulariae, A. maidiradicis, A. pomi, A. sambuci, A. schneideri, A. spiraecola; Arboridia apicalis, Arilus critatus, Aspidiella* spp., *Aspidiotus* spp., *Atanus* spp., *Aulacaspis yasumatsui, Aulacorthum solani, Bactericera cockerelli (Paratrioza cockerelli), Bemisia* spp. such as *B. argentifolii, B. tabaci (Aleurodes tabaci); Blissus* spp. such as *B. leucopterus; Brachycaudus* spp. such as *B. cardui, B. helichrysi, B. persicae, B. prunicola; Brachycolus* spp., *Brachycorynella asparagi, Brevicoryne brassicae, Cacopsylla* spp. such as *C. fulguralis, C. pyricola (Psylla piri); Calligypona marginata, Calocoris* spp., *Campylomma livida, Capitophorus horni, Carneocephala fulgida, Cavelerius* spp., *Ceraplastes* spp., *Ceratovacuna lanigera, Ceroplastes ceriferus, Cerosipha gossypii, Chaetosiphon fragaefolii, Chionaspis tegalensis, Chlorita onukii, Chromaphis juglandicola, Chrysomphalus ficus, Cicadulina mbila, Cimex* spp. such as *C. hemipterus, C. lectularius; Coccomytilus halli, Coccus* spp. such as *C. hesperidum, C. pseudomagnoliarum; Corythucha arcuata, Creontiades dilutus, Cryptomyzus ribis, Chrysomphalus aonidum, Cryptomyzus ribis, Ctenarytaina spatulata, Cyrtopeltis notatus, Dalbulus* spp., *Dasynus piperis, Dialeurodes* spp. such as *D. citrifolii; Dalbulus maidis, Diaphorina* spp. such as *D. citri; Diaspis* spp. such as *D. bromeliae; Dichelops furcatus, Diconocoris hewetti, Doralis* spp., *Dreyfusia nordmannianae, Dreyfusia piceae, Drosicha* spp., *Dysaphis* spp. such as *D. plantaginea, D. pyri, D. radicola; Dysaulacorthum pseudosolani, Dysdercus* spp. such as *D. cingulatus, D. intermedius; Dysmicoccus* spp., *Edessa* spp., *Geocoris* spp., *Empoasca* spp. such as *E. fabae, E. solana; Epidiaspis leperii, Eriosoma* spp. such as *E. lanigerum, E. pyricola; Erythroneura* spp., *Eurygaster* spp. such as *E. integriceps; Euscelis bilobatus, Euschistus* spp. such as *E. heros, E. impictiventris, E. servus; Fiorinia theae, Geococcus coffeae, Glycaspis brimblecombei, Halyomorpha* spp. such as *H. halys; Heliopeltis* spp., *Homalodisca vitripennis (=H. coagulata), Horcias nobilellus, Hyalopterus pruni, Hyperomyzus lactucae, Icerya* spp. such as *I. purchase; Idiocerus* spp., *Idioscopus* spp., *Laodelphax striatellus, Lecanium* spp., *Lecanoideus floccissimus, Lepidosaphes* spp. such as *L. ulmi; Leptocorisa* spp., *Leptoglossus phyllopus, Lipaphis erysimi, Lygus* spp. such as *L. hesperus, L. lineolaris, L. pratensis; Maconellicoccus hirsutus, Marchalina hellenica, Macropes excavatus, Macrosiphum* spp. such as *M. rosae, M. avenae, M. euphorbiae; Macrosteles quadrilineatus, Mahanarva fimbriolata, Megacopta cribraria, Megoura viciae, Melanaphis pyrarius, Melanaphis sacchari, Melanocallis (=Tinocallis) caryaefoliae, Metcafiella* spp., *Metopolophium dirhodum, Monellia costalis, Monelliopsis pecanis, Myzocallis coryli, Murgantia* spp., *Myzus* spp. such as *M. ascalonicus, M. cerasi, M. nicotianae, M. persicae, M. varians; Nasonovia ribis-nigri, Neotoxoptera formosana, Neomegalotomus* spp, *Nephotettix* spp. such as *N. malayanus, N. nigropictus, N. parvus, N. virescens; Nezara* spp. such as *N. viridula; Nilaparvata lugens, Nysius huttoni, Oebalus* spp. such as *O. pugnax; Oncometopia* spp., *Orthezia praelonga, Oxycaraenus hyalinipennis, Parabemisia myricae, Parlatoria* spp., *Parthenolecanium* spp. such as *P. corni, P. persicae; Pemphigus* spp. such as *P. bursarius, P. populivenae; Peregrinus maidis, Perkinsiella saccharicida, Phenacoccus* spp. such as *P. aceris, P. gossypii; Phloeomyzus passerinii, Phorodon humuli, Phylloxera* spp. such as *P. devastatrix, Piesma quadrata, Piezodorus* spp. such as *P. guildinii; Pinnaspis aspidistrae, Planococcus* spp. such as *P. citri, P. ficus; Prosapia bicincta, Protopulvinaria pyriformis, Psallus seriatus, Pseudacysta persea, Pseudaulacaspis pentagon, Pseudococcus* spp. such as *P. comstocki; Psylla* spp. such as *P. mali; Pteromalus* spp., *Pulvinaria amygdali, Pyrilla* spp., *Quadraspidiotus* spp., such as *Q. perniciosus; Quesada gigas, Rastrococcus* spp., *Reduvius senilis, Rhizoecus americanus, Rhodnius* spp., *Rhopalomyzus ascalonicus, Rhopalosiphum* spp. such as *R. pseudobrassicas, R. insertum, R. maidis, R. padi; Sagatodes* spp., *Sahlbergella singularis, Saissetia* spp., *Sappaphis mala, Sappaphis mali, Scaptocoris* spp., *Scaphoides titanus, Schizaphis graminum, Schizoneura lanuginosa, Scotinophora* spp., *Selenaspidus articulatus, Sitobion avenae, Sogata* spp., *Sogatella furcifera, Solubea insularis, Spissistilus festinus (=Stictocephala festina), Stephanitis nashi, Stephanitis pyrioides, Stephanitis takeyai, Tenalaphara malayensis, Tetraleurodes perseae, Therioaphis maculate, Thyanta* spp. such as *T. accerra, T. perditor; Tibraca* spp., *Tomaspis* spp., *Toxoptera* spp. such as *T. aurantii; Trialeurodes* spp. such as *T. abutilonea, T. ricini, T. vaporariorum; Triatoma* spp., *Trioza* spp., *Typhlocyba* spp., *Unaspis* spp. such as *U. citri, U. yanonensis*; and *Viteus vitifolii*, Insects from the order Hymenoptera for example *Acanthomyops interjectus, Athalia rosae, Atta* spp. such as *A. capiguara, A. cephalotes, A. cephalotes, A. laevigata, A. robusta, A. sexdens, A. texana, Bombus* spp., *Brachymyrmex* spp., *Camponotus* spp. such as *C. floridanus, C. pennsylvanicus, C. modoc; Cardiocondyla nuda, Chalibion* sp, *Crematogaster* spp., *Dasymutilla occidentalis, Diprion* spp., *Dolichovespula*

*maculata, Dorymyrmex* spp., *Dryocosmus kuriphilus, Formica* spp., *Hoplocampa* spp. such as *H. minuta, H. testudinea; Iridomyrmex humilis, Lasius* spp. such as *L. niger, Linepithema humile, Liometopum* spp., *Leptocybe invasa, Monomorium* spp. such as *M. pharaonis, Monomorium, Nylandria fulva, Pachycondyla chinensis, Paratrechina longicornis, Paravespula* spp., such as *P. germanica, P. pennsylvanica, P. vulgaris; Pheidole* spp. such as *P. megacephala; Pogonomyrmex* spp. such as *P. barbatus, P. californicus, Polistes rubiginosa, Prenolepis impairs, Pseudomyrmex gracilis, Schelipron* spp., *Sirex cyaneus, Solenopsis* spp. such as *S. geminata, S. invicta, S. molesta, S. richteri, S. xyloni, Sphecius speciosus, Sphex* spp., *Tapinoma* spp. such as *T. melanocephalum, T. sessile; Tetramorium* spp. such as *T. caespitum, T. bicarinatum, Vespa* spp. such as *V. crabro; Vespula* spp. such as *V. squamosal; Wasmannia auropunctata, Xylocopa* sp;

Insects from the order Orthoptera for example *Acheta domesticus, Calliptamus italicus, Chortoicetes terminifera, Ceuthophilus* spp., *Diastrammena asynamora, Dociostaurus maroccanus, Gryllotalpa* spp. such as *G. africana, G. gryllotalpa; Gryllus* spp., *Hieroglyphus daganensis, Kraussaria angulifera, Locusta* spp. such as *L. migratoria, L. pardalina; Melanoplus* spp. such as *M. bivittatus, M. femurrubrum, M. mexicanus, M. sanguinipes, M. spretus; Nomadacris septemfasciata, Oedaleus senegalensis, Scapteriscus* spp., *Schistocerca* spp. such as *S. americana, S. gregaria, Stemopelmatus* spp., *Tachycines asynamorus*, and *Zonozerus variegatus;*

Pests from the Class Arachnida for example Acari, e.g. of the families Argasidae, Ixodidae and Sarcoptidae, such as *Amblyomma* spp. (e.g. *A. americanum, A. variegatum, A. maculatum*), *Argas* spp. such as *A. persicu*), *Boophilus* spp. such as *B. annulatus, B. decoloratus, B. microplus, Dermacentor* spp. such as *D. silvarum, D. andersoni, D. variabilis, Hyalomma* spp. such as *H. truncatum, Ixodes* spp. such as *I. ricinus, I. rubicundus, I. scapularis, I. holocyclus, I. pacificus, Rhipicephalus sanguineus, Ornithodorus* spp. such as *O. moubata, O. hermsi, O. turicata, Ornithonyssus bacoti, Otobius megnini, Dermanyssus gallinae, Psoroptes* spp. such as *P. ovis, Rhipicephalus* spp. such as *R. sanguineus, R. appendiculatus, Rhipicephalus evertsi, Rhizoglyphus* spp., *Sarcoptes* spp. such as *S. Scabier;* and Family Eriophyidae including *Aceria* spp. such as *A. sheldoni, A. anthocoptes, Acallitus* spp., *Aculops* spp. such as *A. lycopersici, A. pelekassi; Aculus* spp. such as *A. schlechtendali; Colomerus vitis, Epitrimerus pyri, Phyllocoptruta oleivora; Eriophytes ribis* and *Eriophyes* spp. such as *Eriophyes sheldoni*; Family Tarsonemidae including *Hemitarsonemus* spp., *Phytonemus pallidus* and *Polyphagotarsonemus latus, Stenotarsonemus* spp. *Steneotarsonemus spinki;* Family Tenuipalpidae including *Brevipalpus* spp. such as *B. phoenicis*; Family Tetranychidae including *Eotetranychus* spp., *Eutetranychus* spp., *Oligonychus* spp., *Petrobia latens, Tetranychus* spp. such as *T. cinnabarinus, T. evansi, T. kanzawai, T. pacificus, T. phaseulus, T. telarius* and *T. urticae; Bryobia praetiosa; Panonychus* spp. such as *P. ulmi, P. citri; Metatetranychus* spp. and *Oligonychus* spp. such as *O. pratensis, O. perseae, Vasates lycopersici; Raoiella indica,* Family Carpoglyphidae including *Carpoglyphus* spp.; *Penthaleidae* spp. such as *Halotydeus destructor*, Family Demodicidae with species such as *Demodex* spp.; Family Trombicidea including *Trombicula* spp.; Family Macronyssidae including *Ornothonyssus* spp.; Family Pyemotidae including *Pyemotes tritici; Tyrophagus putrescentiae;* Family Acaridae including *Acarus siro;* Family Araneida including *Latrodectus mactans, Tegenaria agrestis, Chiracanthium* sp, *Lycosa* sp *Achaearanea tepidariorum* and *Loxosceles reclusa;*

Pests from the Phylum Nematoda, for example, plant parasitic nematodes such as root-knot nematodes, *Meloidogyne* spp. such as *M. hapla, M. incognita, M. javanica*; cyst-forming nematodes, *Globodera* spp. such as *G. rostochiensis; Heterodera* spp. such as *H. avenae, H. glycines, H. schachtii, H. trifolii;* Seed gall nematodes, *Anguina* spp.; Stem and foliar nematodes, *Apheienchoides* spp. such as *A. besseyi*; Sting nematodes, *Belonolaimus* spp. such as *B. longicaudatus*; Pine nematodes, *Bursaphelenchus* spp. such as *B. lignicolus, B. xylophilus*; Ring nematodes, *Criconema* spp., *Criconemella* spp. such as *C. xenoplax* and *C. ornata*; and, *Criconemoides* spp. such as *Criconemoides informis; Mesocriconema* spp.; Stem and bulb nematodes, *Ditylenchus* spp. such as *D. destructor, D. dipsaci*; Awl nematodes, *Dolichodorus* spp.; Spiral nematodes, *Heliocotylenchus multicinctus*; Sheath and sheathoid nematodes, *Hemicycliophora* spp. and *Hemicriconemoides* spp.; *Hirshmanniella* spp.; Lance nematodes, *Hoploaimus* spp.; False rootknot nematodes, *Naccobus* spp.; Needle nematodes, *Longidorus* spp. such as *L. elongatus*; Lesion nematodes, *Pratylenchus* spp. such as *P. brachyurus, P. neglectus, P. penetrans, P. curvitatus, P. goodeyi*; Burrowing nematodes, *Radopholus* spp. such as *R. similis; Rhadopholus* spp.; *Rhodopholus* spp.; Reniform nematodes, *Rotylenchus* spp. such as *R. robustus, R. reniformis; Scutellonema* spp.; Stubby-root nematode, *Trichodorus* spp. such as *T. obtusus, T. primitivus; Paratrichodorus* spp. such as *P. minor*; Stunt nematodes, *Tylenchorhynchus* spp. such as *T. claytoni, T. dubius;* Citrus nematodes, *Tylenchulus* spp. such as *T. semipenetrans*; Dagger nematodes, *Xiphinema* spp.; and other plant parasitic nematode species;

Insects from the order Isoptera for example *Calotermes flavicollis, Coptotermes* spp. such as *C. formosanus, C. gestroi, C. acinaciformis; Comitermes cumulans, Cryptotermes* spp. such as *C. brevis. C. cavifrons; Globitermes sulfureus, Heterotermes* spp. such as *H. aureus, H longiceps, H. tenuis; Leucotermes flavipes, Odontotermes* spp., *Incisitermes* spp. such as *I. minor, I. Snyder, Marginitermes hubbardi, Mastotermes* spp. such as *M. darwiniensis Neocapritermes* spp. such as *N. opacus, N. parvus; Neotermes* spp., *Procornitermes* spp., *Zootermopsis* spp. such as *Z. angusticollis, Z. nevadensis, Reticulitermes* spp. such as *R. hesperus, R. tibialis, R. speratus, R. flavipes, R. grassei, R. fucifugus, R. santonensis, R. virginicus; Termes natalensis,*

Insects from the order Blattaria for example *Blatta* spp. such as *B. orientalis, B. lateralis; Blattella* spp. such as *B. asahinae, B. germanica; Leucophaea maderae, Panchlora nivea, Periplaneta* spp. such as *P. americana, P. australasiae, P. brunnea, P. fuligginosa, P. japonica; Supella longipalpa, Parcoblatta pennsylvanica, Eurycotis floridana, Pycnoscelus surinamensis,*

Insects from the order Siphonoptera for example *Cediopsylla simples, Ceratophyllus* spp., *Ctenocephalides* spp.

such as *C. felis, C. canis, Xenopsylla cheopis, Pulex irritans, Trichodectes canis, Tunga penetrans*, and *Nosopsyllus fasciatus*, Insects from the order Thysanura for example *Lepisma saccharina, Ctenolepisma urbana*, and *Thermobia domestica*, Pests from the class Chilopoda for example *Geophilus* spp., *Scutigera* spp. such as *Scutigera coleoptrata;*

Pests from the class Diplopoda for example *Blaniulus guttulatus, Julus* spp., *Narceus* spp., Pests from the class Symphyla for example *Scutigerella immaculata*, Insects from the order Dermaptera, for example *Forficula auricularia*, Insects from the order Collembola, for example *Onychiurus* spp., such as *Onychiurus armatus*, Pests from the order Isopoda, for example *Armadillidium vulgare, Oniscus asellus, Porcellio scaber;*

Insects from the order Phthiraptera, for example *Damalinia* spp., *Pediculus* spp. such as *Pediculus humanus capitis, Pediculus humanus corporis, Pediculus humanus humanus; Pthirus pubis, Haematopinus* spp. such as *Haematopinus eurysternus, Haematopinus suis; Linognathus* spp. such as *Linognathus vituli; Bovicola bovis, Menopon gallinae, Menacanthus stramineus* and *Solenopotes capillatus, Trichodectes* spp., Examples of further pest species which may be controlled by formulations of the invention include: from the Phylum Mollusca, class Bivalvia, for example, *Dreissena* spp.; class Gastropoda, for example, *Arion* spp., *Biomphalaria* spp., *Bulinus* spp., *Deroceras* spp., *Galba* spp., *Lymnaea* spp., *Oncomelania* spp., *Pomacea canaliclata, Succinea* spp.; from the class of the helminths, for example, *Ancylostoma duodenale, Ancylostoma ceylanicum, Acylostoma braziliensis, Ancylostoma* spp., *Ascaris lubricoides, Ascaris* spp., *Brugia malayi, Brugia timori, Bunostomum* spp., *Chabertia* spp., *Clonorchis* spp., *Cooperia* spp., *Dicrocoelium* spp., *Dictyocaulus filaria, Diphyllobothrium latum, Dracunculus medinensis, Echinococcus granulosus, Echinococcus multilocularis, Enterobius vermicularis, Faciola* spp., *Haemonchus* spp. such as *Haemonchus contortus; Heterakis* spp., *Hymenolepis nana, Hyostrongulus* spp., *Loa Loa, Nematodirus* spp., *Oesophagostomum* spp., *Opisthorchis* spp., *Onchocerca volvulus, Ostertagia* spp., *Paragonimus* spp., *Schistosomen* spp., *Strongyloides fuelleborni, Strongyloides stercoralis, Stronyloides* spp., *Taenia saginata, Taenia solium, Trichinella spiralis, Trichinella nativa, Trichinella britovi, Trichinella nelsoni, Trichinella pseudopsiralis, Trichostrongulus* spp., *Trichuris trichuria, Wuchereria bancrofti*.

The present invention further relates to a method of controlling undesired plant growth and/or undesired insect or mite attack and/or for regulating the growth of plants, wherein the composition is allowed to act on the respective pests, their environment or the crop plants to be protected from the respective pest, on the soil and/or on undesired plants and/or on the crop plants and/or on their environment.

Examples of suitable crop plants are cereals, for example wheat, rye, barley, triticale, oats or rice; beet, for example sugar or fodder beet; pome fruit, stone fruit and soft fruit, for example apples, pears, plums, peaches, almonds, cherries, strawberries, raspberries, currants or gooseberries; legumes, for example beans, lentils, peas, lucerne or soybeans; oil crops, for example oilseed rape, mustard, olives, sunflowers, coconut, cacao, castor beans, oil palm, peanuts or soybeans; cucurbits, for example pumpkins/squash, cucumbers or melons; fiber crops, for example cotton, flax, hemp or jute; citrus fruit, for example oranges, lemons, grapefruit or tangerines; vegetable plants, for example spinach, lettuce, asparagus, cabbages, carrots, onions, tomatoes, potatoes, pumpkin/squash or capsicums; plants of the laurel family, for example avocados, cinnamon or camphor; energy crops and industrial feedstock crops, for example maize, soybeans, wheat, oilseed rape, sugar cane or oil palm; maize; tobacco; nuts; coffee; tea; bananas; wine (dessert grapes and grapes for vinification); hops; grass, for example turf; sweetleaf (*Stevia rebaudania*); rubber plants and forest plants, for example flowers, shrubs, deciduous trees and coniferous trees, and propagation material, for example seeds, and harvested produce of these plants.

The term crop plants also includes those plants which have been modified by breeding, mutagenesis or recombinant methods, including the biotechnological agricultural products which are on the market or in the process of being developed. Genetically modified plants are plants whose genetic material has been modified in a manner which does not occur under natural conditions by hybridizing, mutations or natural recombination (i.e. recombination of the genetic material). Here, one or more genes will, as a rule, be integrated into the genetic material of the plant in order to improve the plant's properties. Such recombinant modifications also comprise posttranslational modifications of proteins, oligo- or polypeptides, for example by means of glycosylation or binding polymers such as, for example, prenylated, acetylated or farnesylated residues or PEG residues.

Formulations according to the inventions are especially suitable for controlling insects on row crops (e.g. soybeans, cottons), vegetables, tree fruits and grapes.

The present invention further relates to seed containing the composition.

Another embodiment of the present invention are tank mixes comprising formulations according to the invention.

Another embodiment of the present invention is a method of controlling insects comprising the steps
i) Providing a formulation according to the invention,
ii) emulsifying such formulation with water,
iii) applying the emulsion obtained in step ii) to the crops.

The present invention offers various advantages:
It is easy and economical to carry out.
A formulation is provided in which afidopyropen as well as cypermethrines like alpha-cypermethrin show a high stability against degradation or decomposition.
Formulations according to the invention have a high storage stability at room temperature and elevated temperatures.
Formulations according to the invention can be either applied to the field or can be used in tank mixes.
Formulations according to the invention have a high stability with respect to the precipitation of the components.
Formulations according to the invention show a high activity for controlling pests like insects.
The examples which follow illustrate the invention without imposing any limitation.

EXAMPLES

Solvent A Cyclohexanone
Solvent B C8-C10 fatty acid dimethylamide
Solvent C propylene carbonate
Surfactant A castor oil, ethoxylated Surfactant B difunctional EO-PO block copolymer surfactant terminating in primary hydroxyl groups with an average molecular weight MN of 2500 g/mol calculated from OH number according to DIN 53240)
Surfactant C tristyrylphenol ethoxylate with an average molar content of 10 EO units per mol
Surfactant D liquid nonionic ethoxylated and propoxylated C12-18 aliphatic alcohol, water-insoluble, soluble in alcohols, solidification temperature about −5 to −8° C.
Diluent A polyethylene glycol with an average of 400 g/mol (calculated from the OH number according to DIN 53240)
Stabilizer A Tetra (2-hydroxypropyl)ethylenediamine
Stabilizer B Branched Dodecyl Benzene Sulfonic Acid
Stabilizer C Cictric acid Example 1

EC formulations with following recipe were prepared by mixing the components given in table 1:

TABLE 1

Composition of EC formulations according to example 1

| EC formulation | Concentration (w/w) |
| --- | --- |
| Afidopyropen | 1.89% |
| Alpha-cypermethrin | 5.30% |
| Solvent A | 2.84% |
| Solvent B | 14.20% |
| Solvent C | 14.20% |
| Surfactant A | 8.52% |
| Surfactant B | 5.02% |
| Surfactant C | 4.73% |
| Surfactant D | 18.94% |
| Stabilizer | See table 2 below |
| Diluent A | add to 100% |

Four formulations with above recipe varied by different chemical stabilizers were prepared:

TABLE 2

Content of Stabilizers in Formulations A to D
[wt % based on the formulation]

| | Formulation ID | | | |
| --- | --- | --- | --- | --- |
| | A | B | C | D |
| Chemical stabilizer | 0.2% Stabilizer A | 0.20% Stabilizer B | 0.2% Stabilizer A 0.4% Stabilizer B | 0.4% Stabilizer A 0.3% Stabilizer C |

Chemical storage stability testing of above formulations was carried out to demonstrate chemical degradation. Results were summarized in the following table.

| | % Degradation | | |
| --- | --- | --- | --- |
| Formulation ID | Afidopyropen | Alpha-cypermethrin | Storage Conditions |
| A | 0.0% | 48.6% | 1 week at 65° C. |
| B | 88.3% | 0.4% | 2 weeks at 54° C. |
| C | 23.5% | 0.2% | 1 week at 65° C. |
| D | 0.0% | 6.0% | 1 week at 54° C. |

In each of the formulations, at last one active ingredient showed significant degradation Example 2

Chemical stabilization of Afidopyropen and Alpha-cypermethrin based on the present invention
An EC formulation E with following recipe stabilized by a mixture of three stabilizers was prepared to demonstrate the present invention

| EC formulation | Concentration (w/w) |
| --- | --- |
| Afidopyropen | 1.89% |
| Alpha-cypermethrin | 5.30% |
| Solvent A | 2.84% |
| Solvent B | 14.20% |
| Solvent C | 14.20% |
| Surfactant A | 8.52% |
| Surfactant B | 5.02% |
| Surfactant C | 4.73% |
| Surfactant D | 18.94% |
| Stabilizer A | 0.38% |
| Stabilizer B | 0.38% |
| Stabilizer C | 0.33% |
| Diluent A | 23.25% |

The above formulation was stored for 2 weeks at 54 C and 12 weeks at 40° C. The chemical stability was summarized at following table:

| | % Degradation | | |
| --- | --- | --- | --- |
| Formulation ID | Afidopyropen | Alpha-cypermethrin | Storage Conditions |
| Example 2 | 1.0% | 0.7% | 2 weeks @ 54 C. |
| Example 2 | 0.0% | 3.0% | 12 weeks @ 40 C. |

Both active ingredients showed no or insignificant degradation.

The invention claimed is:
1. Agrochemical formulation, comprising
   a) afidopyropen,
   b) a cypermethrin,
   c) at least one organic solvent S comprising at least one ketone, at least one carbonate, and at least one fatty acid amide,
   d) at least one alkanol substituted amine D selected from the group consisting of triethanolamine, tetra (2-hydrooxypropyl)ethylenediamine, and combinations thereof,
   e) at least one aryl sulfonic acid E or their salts, wherein the at least one aryl sulfonic acid E comprises a benzene sulfonic acid that can optionally be alkyl substituted on the aromatic ring,
   f) at least one organic tricarboxylic acid F or their salts,
   g) at least one nonionic surfactant G different from the components c) to f) and h), and
   h) optionally further components.
2. The agrochemical formulation of claim 1, wherein the cypermethrin comprises alpha-cypermethrin.
3. The agrochemical formulation according to claim 1, comprising
   a) 0.1 to 15 wt % of the afidopyropen,
   b) 0.1 to 15 wt % of the cypermethrin,
   c) 20 to 80 wt % of the at least one organic solvent S, d) 0.001 to 10 wt % of the at least one alkanol substituted amine D,
e) 0.001 to 10 wt % of the at least one aryl sulfonic acid E or their salts,
f) 0.001 to 10 wt % of the at least one organic tricarboxylic acid F or their salts,
g) 5 to 60 wt % of the at least one nonionic surfactant G different from components c) to f) and h), and
h) optionally the further components,
wherein the shares of components a) to h) add up to 100% and all percentages being relative to the formulation.

4. The agrochemical formulation according to claim 1, comprising
a) 1 to 10 wt % of the afidopyropen,
b) 1 to 10 wt % of the cypermethrin,
c) 20 to 80 wt % of the at least one organic solvent S,
d) 0.01 to 2 wt % of the at least one alkanol substituted amine D,
e) 0.01 to 2 wt % of the at least one aryl sulfonic acid E or their salts,
f) 0.01 to 2 wt % of the at least one organic tricarboxylic acid F or their salts,
g) 5 to 60 wt % of the at least one nonionic surfactant G different from components c) to f) and h), and
h) optionally further components,
wherein the shares of components a) to h) add up to 100% and all percentages being relative to the formulation.

5. The agrochemical formulation according to claim 1, wherein said formulation is an emulsifiable concentrate (EC).

6. The agrochemical formulation according to claim 1, wherein said at least one alkanol substituted amine D is tetra (2-hydroxypropyl)ethylenediamine.

7. The agrochemical formulation according to claim 1, wherein the benzene sulfonic acid is alkyl substituted on the aromatic ring.

8. The agrochemical formulation according to claim 7, wherein the benzene sulfonic acid is substituted on the aromatic ring with a linear or branched C4 to C20 alkyl group.

9. The agrochemical formulation according to claim 1, wherein said at least one organic tricarboxylic acid F is selected from citric acid.

10. The agrochemical formulation according to claim 1, wherein said at least one nonionic surfactant G comprises at least one alkoxylate.

11. The agrochemical formulation according to claim 10, wherein said at least one nonionic surfactant G comprises at least one alkoxylated aliphatic alcohol of formula (A)

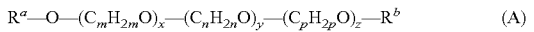

in which
$R^a$ represents $C_8$-$C_{36}$alkyl, $C_8$-$C_{36}$-alkenyl or a mixture thereof;
$R^b$ represents H or $C_1$-$C_{12}$-alkyl;
m, n, p represent, independently of one another, an integer from 2 to 16;
x, y, z represent, independently of one another, a number from 0 to 50; and
x+y+z corresponds to a value from 2 to 50.

12. The agrochemical formulation according to claim 1, comprising
a) 1 to 5 wt % of the afidopyropen,
b) 1 to 10 wt % of alpha-cypermethrin as the cypermethrin,
c) 20 to 80 wt % of the at least one organic solvent S,
d) 0.01 to 1 wt % of tetra (2-hydroxypropyl)ethylenediamine as the at least one alkanol substituted amine D,
e) 0.01 to 1 wt % of at least one alkyl benzene sulfonic acid as the at least one aryl sulfonic acid E or their salts,
f) 0.01 to 1 wt % of a citric acid as the at least one organic tricarboxylic acid F or its salts,
g) 5 to 60 wt % of the at least one nonionic surfactant different G from components c) to f) andh), wherein the at least one nonionic surfactant different G comprises at least one alkoxylated aliphatic alcohol of formula (A)

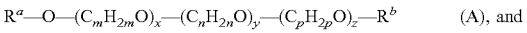 (A), and h) optionally the further components,
wherein the shares of components a) to h) add up to 100% and all percentages being relative to the formulation.

13. A method of controlling insects, the method comprising the steps
i) providing a formulation according to claim 1,
ii) emulsifying the formulation with water,
iii) applying the emulsion obtained in step ii) to crops.

14. The agrochemical formulation according to claim 2, wherein said formulation is an emulsifiable concentrate (EC).

15. The agrochemical formulation according to claim 2, wherein the benzene sulfonic acid is alkyl substituted on the aromatic ring.

16. The agrochemical formulation according to claim 2, wherein said at least one organic tricarboxylic acid F is selected from citric acid.

17. The agrochemical formulation according to claim 2, wherein said at least one nonionic surfactant G comprises at least one alkoxylate.

18. A method of controlling insects comprising the steps
i) providing a formulation according to claim 2,
ii) emulsifying the formulation with water,
iii) applying the emulsion obtained in step ii) to crops.

19. The agrochemical formulation according to claim 1, wherein:
the cypermethrin comprises alpha-cypermethrin;
the at least one organic solvent S comprises a mixture of cyclohexanone, C8-C10 fatty acid dimethylamide, and propylene carbonate; and
the at least one nonionic surfactant G comprises an alkoxylate block polymer.

20. The agrochemical formulation according to claim 1, wherein the agrochemical formulation is free from aliphatic, cyclic, and aromatic hydrocarbons.

21. The agrochemical formulation according to claim 1, wherein the agrochemical formulation is free from water.

* * * * *